US012340749B2

(12) United States Patent
Uchida

(10) Patent No.: US 12,340,749 B2
(45) Date of Patent: Jun. 24, 2025

(54) DISPLAY DEVICE INCLUDING A PLURALITY OF PIXEL CIRCUITS AND LUMINANCE DRIVING METHOD THEREFOR

(71) Applicant: Sharp Display Technology Corporation, Kameyama (JP)

(72) Inventor: Seiichi Uchida, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/692,939

(22) PCT Filed: Nov. 5, 2021

(86) PCT No.: PCT/JP2021/040727
§ 371 (c)(1),
(2) Date: Mar. 18, 2024

(87) PCT Pub. No.: WO2023/079674
PCT Pub. Date: May 11, 2023

(65) Prior Publication Data

US 2024/0395204 A1 Nov. 28, 2024

(51) Int. Cl.
*G09G 3/30* (2006.01)
*G09G 3/3233* (2016.01)
(Continued)

(52) U.S. Cl.
CPC ......... *G09G 3/3233* (2013.01); *G09G 3/3266* (2013.01); *G09G 3/3275* (2013.01); *G09G 2310/08* (2013.01); *G09G 2330/023* (2013.01)

(58) Field of Classification Search
CPC .............................................. G09G 3/30–3291
See application file for complete search history.

(56) References Cited

U.S. PATENT DOCUMENTS

2010/0289782 A1 11/2010 Yamamoto et al.
2015/0364106 A1* 12/2015 Kim ......................... G09G 5/02
345/94

(Continued)

FOREIGN PATENT DOCUMENTS

JP 2005-092006 A 4/2005
JP 2008-176115 A 7/2008
JP 2010-266492 A 11/2010

OTHER PUBLICATIONS

Official Communication issued in International Patent Application No. PCT/JP2021/040727, mailed on Jan. 18, 2022.

*Primary Examiner* — Roy P Rabindranath
(74) *Attorney, Agent, or Firm* — Keating & Bennett, LLP

(57) ABSTRACT

Regarding a display device using a display element driven by a current, visibility in an environment where external light is strong is improved while suppressing deterioration in display quality and an increase in cost.

An adjustment circuit (22) and an adjustment capacitor (Cp) for adjusting an amount of drive currents are provided for each one pixel circuit (20) or every plural pixel circuits (20). As for the adjustment capacitor (Cp), a first electrode is connected to a drive current control node (NG) connected to a control terminal of a drive transistor (T4), and a second electrode is connected to a light emission intensity adjustment node (NP) in the adjustment circuit (22). The adjustment circuit (22) includes a photodiode (220) and a photocurrent control transistor (T8) provided in series with each other between a high-level power supply line and the light emission intensity adjustment node (NP), and a third initialization transistor (T9) provided between an initialization power supply line and the light emission intensity adjustment node (NP).

19 Claims, 24 Drawing Sheets

(51) Int. Cl.
*G09G 3/3266* (2016.01)
*G09G 3/3275* (2016.01)

(56) References Cited

U.S. PATENT DOCUMENTS

| | | | | |
|---|---|---|---|---|
| 2017/0039947 | A1* | 2/2017 | Zhang | G09G 3/3258 |
| 2022/0208084 | A1* | 6/2022 | Jeong | G09G 3/32 |
| 2023/0222972 | A1* | 7/2023 | Choi | G09G 3/3225<br>345/76 |

* cited by examiner

DISPLAY DEVICE INCLUDING A PLURALITY OF PIXEL CIRCUITS AND LUMINANCE DRIVING METHOD THEREFOR

TECHNICAL FIELD

The following disclosure relates to a display device employing a configuration in which variations in characteristics of transistors in a pixel circuit are compensated for by an internal compensation method, and a driving method for the display device.

BACKGROUND ART

In recent years, an organic EL display device including a pixel circuit including an organic EL element has been put into practical use. The organic EL element is also called an organic light-emitting diode (OLED), and is a self-luminous display element that emits light with luminance corresponding to a current flowing therethrough. Since the organic EL element is a self-luminous display element as described above, the organic EL display device can easily be made thinner, have lower power consumption, and have higher luminance as compared with a liquid crystal display device that requires a backlight, a color filter, and the like. Therefore, in recent years, organic EL display devices have been actively developed.

Regarding a pixel circuit of an organic EL display device, a thin film transistor (TFT) is typically employed as a drive transistor for controlling supply of a current to an organic EL element. However, characteristics of thin film transistors are likely to vary. Specifically, the threshold voltage tends to vary. When a variation in threshold voltage occurs in the drive transistor provided in a display unit, a variation in luminance occurs, and thus display quality is deteriorated. Therefore, various types of processing for compensating for variations in threshold voltage (compensation processing) have been proposed.

As methods of the compensation processing, an internal compensation method of performing the compensation processing by providing, in a pixel circuit, a capacitor for holding information of a threshold voltage of a drive transistor, and an external compensation method of performing the compensation processing by, for example, measuring a magnitude of a current flowing through the drive transistor under a predetermined condition by a circuit provided outside the pixel circuit and correcting a video signal on the basis of a measurement result are known.

As a pixel circuit of an organic EL display device adopting the internal compensation method for compensation processing, for example, as illustrated in FIG. 20, a pixel circuit 90 including one organic EL element 99, seven transistors (typically thin film transistors) T91 to T97 (first initialization transistor T91, threshold voltage compensation transistor T92, write control transistor T93, drive transistor T94, power supply control transistor T95, light emission control transistor T96, second initialization transistor T97), and one holding capacitor C9 is known. Hereinafter, a node connected to a control terminal of the drive transistor T94 is referred to as a "drive current control node". Note that FIG. 20 illustrates a configuration of the pixel circuit 90 of the nth row and the mth column.

The operation of the pixel circuit 90 illustrated in FIG. 20 will be described with reference to FIG. 21. In a period P91, a scanning signal GL(n−1) and a scanning signal GL(n) are at a high level, a light emission control signal EM(n) is at a low level, and a potential of a drive current control node NG is at a level depending on the writing of a data signal DL(m) in a previous frame. In this period, the power supply control transistor T95 and the light emission control transistor T96 are in an on state, and a drive current flows as indicated by an arrow denoted by reference character 91 in FIG. 22. As a result, the organic EL element 99 emits light depending on a magnitude of the drive current.

In a period P92, the light emission control signal EM(n) changes from the low level to the high level. As a result, the power supply control transistor T95 and the light emission control transistor T96 are turned off. As a result, the supply of the current to the organic EL element 99 is cut off, and the organic EL element 99 is turned off. Furthermore, in the period P92, the scanning signal GL(n−1) changes from the high level to the low level, so that the first initialization transistor T91 goes into an on state. As a result, as indicated by an arrow denoted by reference character 92 in FIG. 23, the potential of the drive current control node NG is initialized based on an initialization potential Vini.

In a period P93, the scanning signal GL(n−1) changes from the low level to the high level. As a result, the first initialization transistor T91 is turned off. Furthermore, in the period P93, the scanning signal GL(n) changes from the high level to the low level. As a result, the threshold voltage compensation transistor T92, the write control transistor T93, and the second initialization transistor T97 are turned on. When the threshold voltage compensation transistor T92 and the write control transistor T93 are turned on, the data signal DL(m) is provided to the drive current control node NG via the write control transistor T93, the drive transistor T94, and the threshold voltage compensation transistor T92 as indicated by an arrow denoted by reference character 93 in FIG. 24. At this time, when a gate-source voltage of the drive transistor T94 becomes equal to a threshold voltage of the drive transistor T94, the drive transistor T94 is turned off. That is, the potential of the drive current control node NG is equal to the sum of a source potential of the drive transistor T94 and the threshold voltage of the drive transistor T94. In this manner, the drive current control node NG is charged on the basis of the data signal DL(m), and the threshold voltage of the drive transistor T94 is compensated for. Furthermore, when the second initialization transistor T97 is turned on, an anode potential of the organic EL element 99 is initialized based on the initialization potential Vini as indicated by an arrow denoted by reference character 94 in FIG. 24.

In a period P94, the scanning signal GL(n) changes from the low level to the high level. As a result, the threshold voltage compensation transistor T92, the write control transistor T93, and the second initialization transistor T97 are turned off. Furthermore, in the period P94, the light emission control signal EM(n) changes from the high level to the low level. As a result, the power supply control transistor T95 and the light emission control transistor T96 are turned on, and a drive current flows as indicated by an arrow denoted by reference character 91 in FIG. 22. That is, the organic EL element 99 emits light depending on the magnitude of the drive current.

An image is displayed on the display unit by the operation of each pixel circuit 90 as described above, but when the organic EL display device is used in an environment where external light is strong such as outdoors, the degree of brightness is relatively lower in a display screen than in the surroundings, and visibility is deteriorated.

Japanese Laid-Open Patent Publication No. 2008-176115 discloses an organic EL display device that calculates an adjustment value of a light emission period for each pixel on the basis of light emission luminance information and external light illuminance information, and controls operation of a scan circuit on the basis of the adjustment value to adjust display luminance. Furthermore, Japanese Laid-Open Patent Publication No. 2005-92006 discloses an organic EL display device including a pixel circuit having a configuration in which a light detection diode is provided in parallel with a drive transistor so that the light emission intensity of an organic EL element is autonomously adjusted depending on the intensity of external light.

PRIOR ART DOCUMENT

Patent Documents

[Patent Document 1] Japanese Laid-Open Patent Publication No. 2008-176115
[Patent Document 2] Japanese Laid-Open Patent Publication No. 2005-92006

SUMMARY

Problems to be Solved by the Invention

However, according to the method disclosed in Japanese Laid-Open Patent Publication No. 2008-176115, it is necessary to detect the intensity of external light and adjust the light emission period of the organic EL element depending on the detected intensity. Therefore, it is necessary to provide a control system or a control chip outside a panel, and the cost increases. Furthermore, according to the method disclosed in Japanese Laid-Open Patent Publication No. 2005-92006, since the light detection diode is connected in parallel with the drive transistor and in series with the organic EL element, there is a concern that a desired current does not flow through the organic EL element. That is, there is a concern about degradation of display quality.

Therefore, the following disclosure relates to a display device (for example, an organic EL display device) using a display element driven by a current, and an object thereof is to improve visibility in an environment where external light is strong while suppressing deterioration in display quality and an increase in cost.

Means for Solving the Problems

A display device according to some embodiments of the present disclosure is a display device including a plurality of pixel circuits, each of the pixel circuits including a display element configured to emit light with luminance depending on an amount of a drive current to be supplied, the display device including:

a first power supply line to which a first power supply potential is applied;

a second power supply line to which a second power supply potential is applied;

an initialization power supply line to which an initialization potential is applied;

an adjustment circuit configured to adjust an amount of the drive current; and an adjustment capacitor, wherein each of the plurality of pixel circuits includes:

the display element provided between the first power supply line and the second power supply line, and including a first terminal on a side of the first power supply line and a second terminal on a side of the second power supply line;

a drive transistor including a control terminal, a first conduction terminal, and a second conduction terminal, and provided in series with the display element to supply the drive current to the display element during a predetermined light emission period; and a drive current control node connected to the control terminal of the drive transistor and one end of the adjustment capacitor, and configured to be charged based on a data signal during a predetermined charging period, and the adjustment circuit includes:

a light emission intensity adjustment node connected to another end of the adjustment capacitor;

a light receiving circuit including a light receiving element and connected to the light emission intensity adjustment node, the light receiving circuit being configured to generate a photocurrent depending on intensity of light incident on the light receiving element during the charging period; and a light emission intensity adjustment node initialization circuit configured to initialize the light emission intensity adjustment node based on the initialization potential during a period between the charging period and the light emission period.

A driving method (for a display device) according to some embodiments of the present disclosure is a driving method for a display device including a plurality of pixel circuits, each of the plurality of pixel circuits including a display element configured to emit light with luminance depending on an amount of a drive current to be supplied, the display device including:

a first power supply line to which a first power supply potential is applied;

a second power supply line to which a second power supply potential is applied;

an initialization power supply line to which an initialization potential is applied;

an adjustment circuit configured to adjust an amount of the drive current; and an adjustment capacitor, each of the plurality of pixel circuits including:

the display element provided between the first power supply line and the second power supply line, and including a first terminal on a side of the first power supply line and a second terminal on a side of the second power supply line;

a drive transistor including a control terminal, a first conduction terminal, and a second conduction terminal, and provided in series with the display element to supply a drive current to the display element during a predetermined light emission period; and a drive current control node connected to the control terminal of the drive transistor and one end of the adjustment capacitor, the adjustment circuit including:

a light emission intensity adjustment node connected to another end of the adjustment capacitor; and a light receiving circuit including a light receiving element and connected to the light emission intensity adjustment node, the driving method including the steps of:

stopping supply of the drive current to the display element;

charging the drive current control node based on a data signal, and generating a photocurrent depending on intensity of light incident on the light receiving element by the light receiving circuit;

initializing the light emission intensity adjustment node based on the initialization potential; and resuming the supply of the drive current to the display element.

Effects of the Invention

According to some embodiments of the present disclosure, a display device is provided with an adjustment circuit that adjusts an amount of a drive current supplied to a display element in a pixel circuit. The adjustment circuit includes a light receiving circuit that is connected to a light emission intensity adjustment node and generates a photocurrent depending on the intensity of light, and a light emission intensity adjustment node initialization circuit that initializes the light emission intensity adjustment node. Furthermore, the display device is provided with an adjustment capacitor including one end connected to a drive current control node (a node connected to a control terminal of a drive transistor) and the other end connected to the light emission intensity adjustment node. With the above configuration, when the light emission intensity adjustment node is initialized after a potential of the light emission intensity adjustment node is changed depending on the intensity of external light, a potential of the drive current control node changes depending on a change in the potential of the light emission intensity adjustment node due to the initialization. That is, the potential of the drive current control node changes depending on the intensity of the external light. As a result, a larger amount of drive current than the original amount is supplied to the display element depending on the intensity of the external light. Here, since a light receiving element in the adjustment circuit is not directly connected to the drive transistor or the display element, an unintended current does not flow through the display element during a light emission period of the display element. Furthermore, since the potential of the drive current control node is controlled depending on the intensity of the external light, it is not necessary to provide a control system or a control chip outside a panel, for example. From the above, with respect to the display device (display device including a pixel circuit including a display element that emits light with luminance depending on an amount of drive current to be supplied), visibility in an environment where external light is strong is improved while degradation in display quality and an increase in cost are suppressed.

BRIEF DESCRIPTION OF THE DRAWINGS illustrating FIG. 1 is a circuit diagram a configuration of a pixel circuit of an nth row and an mth column and its peripheral circuits in a first embodiment.

MODES FOR CARRYING OUT THE INVENTION

Hereinafter, embodiments will be described with reference to the accompanying drawings. Regarding second to fourth embodiments, points different from a first embodiment will be mainly described, and description of points similar to the first embodiment will be omitted as appropriate. Note that, in the following description, it is assumed that i and j are integers of 2 or more, n is an integer of 1 or more and i or less, and m is an integer of 1 or more and j or less.

1. First Embodiment

<1.1 Overall Configuration>

Figure 2:
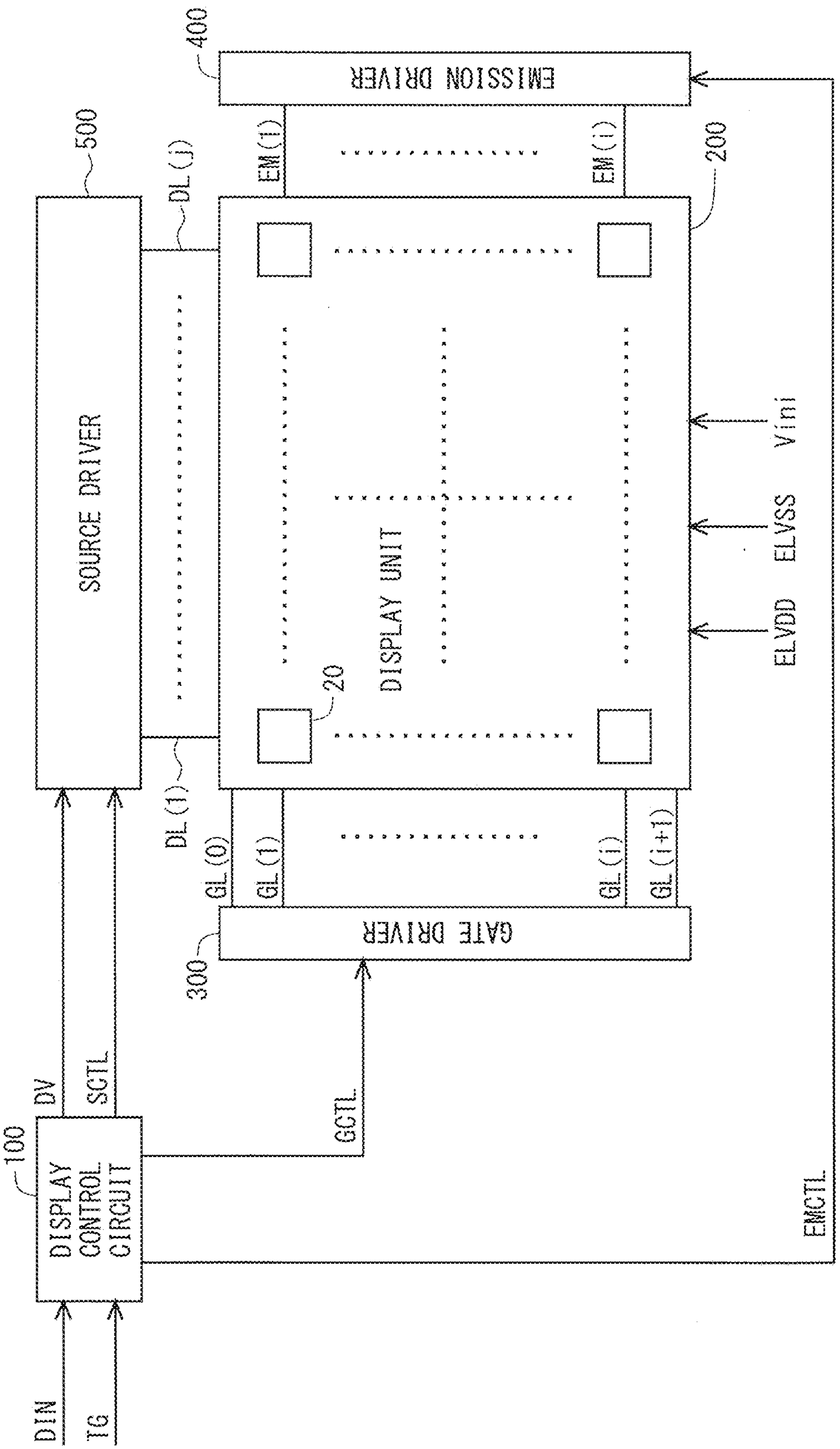
FIG. 2 is a block diagram illustrating an overall configuration of an organic EL display device according to the first embodiment.

FIG. 2 is a block diagram illustrating an overall configuration of an organic EL display device according to a first embodiment. As illustrated in FIG. 2, the organic EL display device includes a display control circuit 100, a display unit 200, a gate driver (scanning signal line drive circuit) 300, an emission driver (light emission control line drive circuit) 400, and a source driver (data signal line drive circuit) 500.

Note that, in FIG. 2, the gate driver 300 is provided only on one end side of the display unit 200 (the left side of the display unit 200 in the drawing), but a configuration in which the gate drivers 300 are provided on both one end side of the display unit 200 and the other end side thereof (the right side of the display unit 200 in the drawing) can also be adopted. Similarly, it is also possible to adopt a configuration in which the emission drivers 400 are provided on both one end side and the other end side of the display unit 200.

In the display unit 200, (i+2) scanning signal lines GL(0) to GL(i+1), i light emission control lines EM(1) to EM(i), and j data signal lines DL(1) to DL(j) are disposed. Note that illustration thereof is omitted regarding the inside of the display unit 200 in FIG. 2. The scanning signal lines GL(0) to GL(i+1) and the light emission control lines EM(1) to EM(i) are typically parallel to each other. The scanning signal lines GL(0) to GL(i+1) and the data signal lines DL(1) to DL(j) are orthogonal to each other. Each scanning signal line GL transmits a scanning signal, each light emission control line EM transmits a light emission control signal, and each data signal line DL transmits a data signal. The display unit 200 is also provided with i×j pixel circuits 20. The i×j pixel circuits 20 form a pixel matrix of i rows and j columns. Hereinafter, as necessary, the scanning signal is also denoted by reference character GL, the light emission control signal is also denoted by reference character EM, and the data signal is also denoted by reference character DL.

Moreover, in the display unit 200, power supply lines (not illustrated) common to the pixel circuits 20 are disposed. More specifically, a power supply line that supplies a high-level power supply potential ELVDD for driving the organic EL element (hereinafter, it is referred to as a "high-level power supply line"), a power supply line that supplies a low-level power supply potential ELVSS for driving the organic EL element (hereinafter, it is referred to as a "low-level power supply line"), and a power supply line that supplies an initialization potential Vini (hereinafter, it is referred to as an "initialization power supply line") are disposed. The initialization potential Vini is a potential lower than the high-level power supply potential ELVDD. The high-level power supply potential ELVDD, the low-level power supply potential ELVSS, and the initialization potential Vini are supplied from a power supply circuit (not illustrated). Note that the high-level power supply potential ELVDD corresponds to a first power supply potential, and the low-level power supply potential ELVSS corresponds to a second power supply potential. Furthermore, the high-level power supply line corresponds to a first power supply line, and the low-level power supply line corresponds to a second power supply line.

Hereinafter, the operation of each component illustrated in FIG. 2 will be described. The display control circuit 100 receives an input image signal DIN and a timing signal group (horizontal synchronization signal, vertical synchronization signal, etc.) TG transmitted from the outside, and outputs a digital video signal DV, a gate control signal GCTL for controlling the operation of the gate driver 300, an emission driver control signal EMCTL for controlling the operation of the emission driver 400, and a source control signal SCTL for controlling the operation of the source driver 500. The gate control signal GCTL includes a gate start pulse signal, a gate clock signal, and the like. The emission driver control signal EMCTL includes an emission start pulse signal, an emission clock signal, and the like. The source control signal SCTL includes a source start pulse signal, a source clock signal, a latch strobe signal, and the like.

The gate driver 300 is connected to the scanning signal lines GL(0) to GL(i+1). The gate driver 300 applies scanning signals to the scanning signal lines GL(0) to GL(i+1) based on the gate control signal GCTL outputted from the display control circuit 100. That is, the gate driver 300 selectively drives the scanning signal lines GL(0) to GL(i+1) sequentially.

The emission driver 400 is connected to the light emission control lines EM(1) to EM(i). The emission driver 400 applies light emission control signals to the light emission control lines EM(1) to EM(i) based on the emission driver control signal EMCTL outputted from the display control circuit 100.

The source driver 500 includes a j-bit shift register, a sampling circuit, a latch circuit, j D/A converters, and the like (not illustrated). The shift register includes j registers connected in cascade. The shift register sequentially transfers the pulse of the source start pulse signal supplied to the first-stage register from an input terminal to an output terminal based on the source clock signal. The sampling pulse is outputted from each stage of the shift register according to the transfer of the pulse. Based on the sampling pulse, the sampling circuit stores the digital video signals DV. The latch circuit captures and holds the digital video signals DV for one row stored in the sampling circuit according to the latch strobe signal. The D/A converter is provided so as to correspond to each of the data signal lines DL(1) to DL(j). The D/A converter converts the digital video signal DV held in the latch circuit into an analog voltage. The converted analog voltages are simultaneously applied to all the data signal lines DL(1) to DL(j) as data signals.

As described above, the data signals are applied to the data signal lines DL(1) to DL(j), the scanning signals are applied to the scanning signal lines GL(0) to GL(i+1), and the light emission control signals are applied to the light emission control lines EM(1) to EM(i), whereby an image based on the input image signal DIN is displayed on the display unit 200.

<1.2 Configuration of Pixel Circuit and its Peripheral Circuits>

Figure 1:
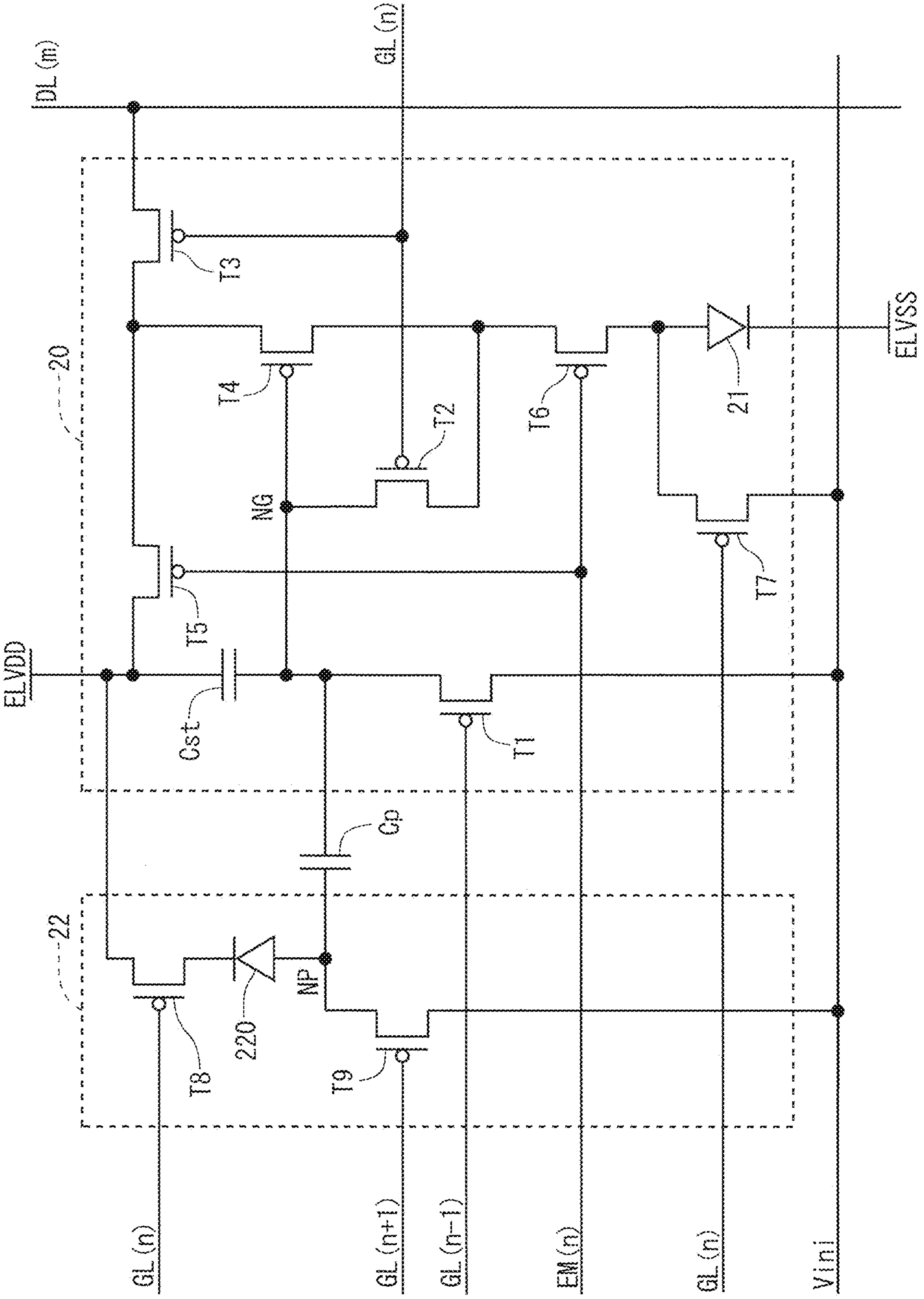

Next, configurations of the pixel circuit 20 and its peripheral circuits in the present embodiment will be described. FIG. 1 is a circuit diagram illustrating a configuration of the pixel circuit 20 of an nth row and an mth column and its peripheral circuits. In the present embodiment, as illustrated in FIG. 1, corresponding to one pixel circuit 20, one adjustment circuit 22 for adjusting an amount of the drive current supplied to the organic EL element 21 in the pixel circuit 20 is provided. Furthermore, an adjustment capacitor Cp is provided between the pixel circuit 20 and the adjustment circuit 22. As above, the adjustment circuit 22 and the adjustment capacitor Cp are provided for each pixel circuit 20. As for the adjustment capacitor Cp, a first electrode is connected to a drive current control node NG in the pixel circuit 20, and a second electrode is connected to a light emission intensity adjustment node NP in the adjustment circuit 22.

Figure 20:
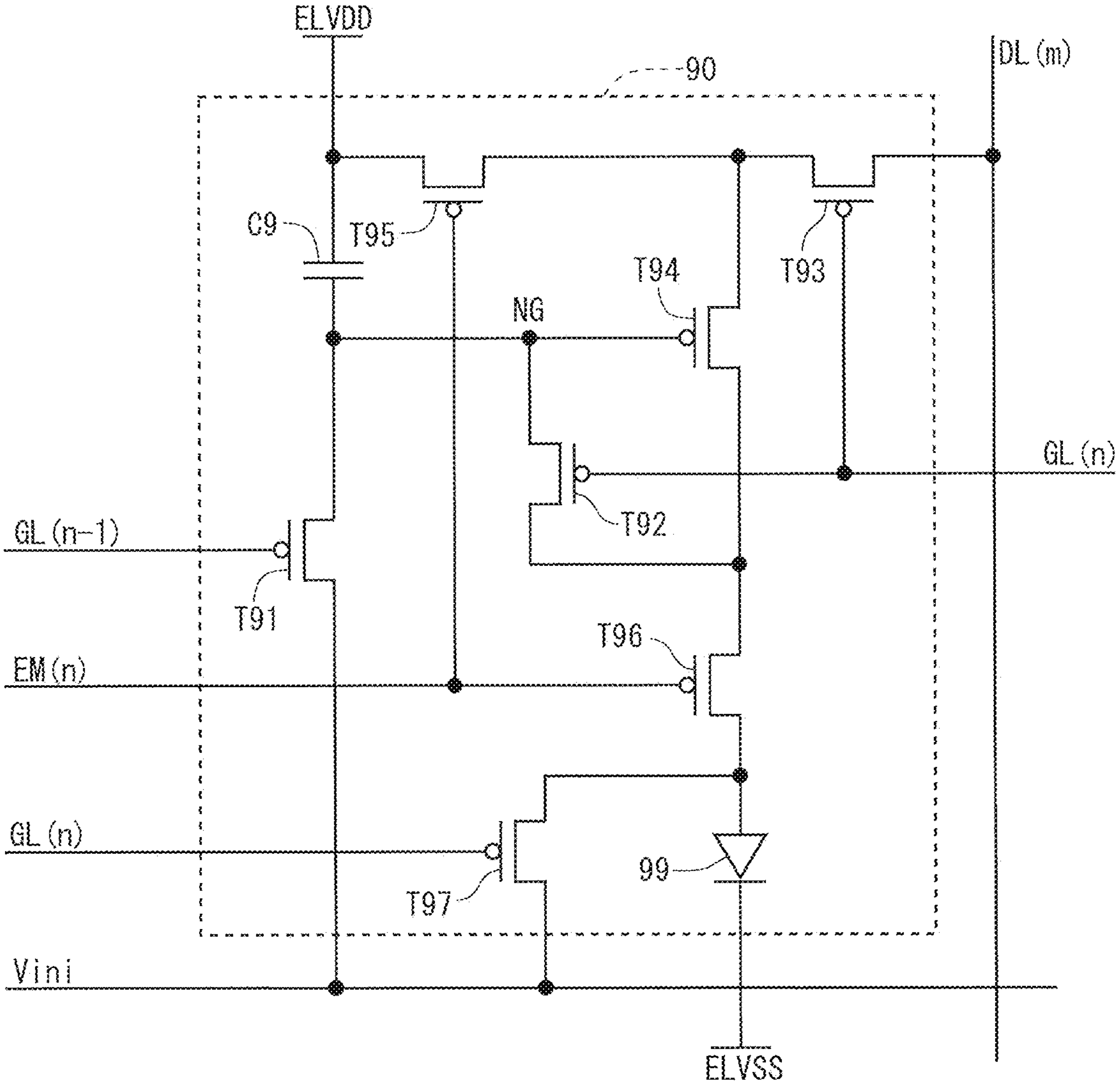
FIG. 20 is a circuit diagram illustrating a general configuration of a pixel circuit of an organic EL display device adopting an internal compensation method for compensation processing.
Figure 21:
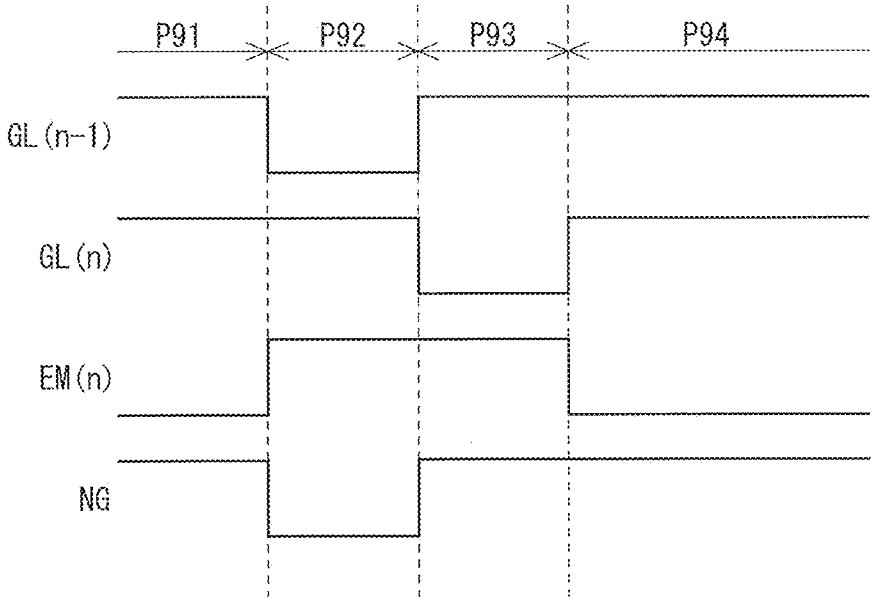
FIG. 21 is a timing chart for explaining the operation of the pixel circuit illustrated in FIG. 20.
Figure 22:
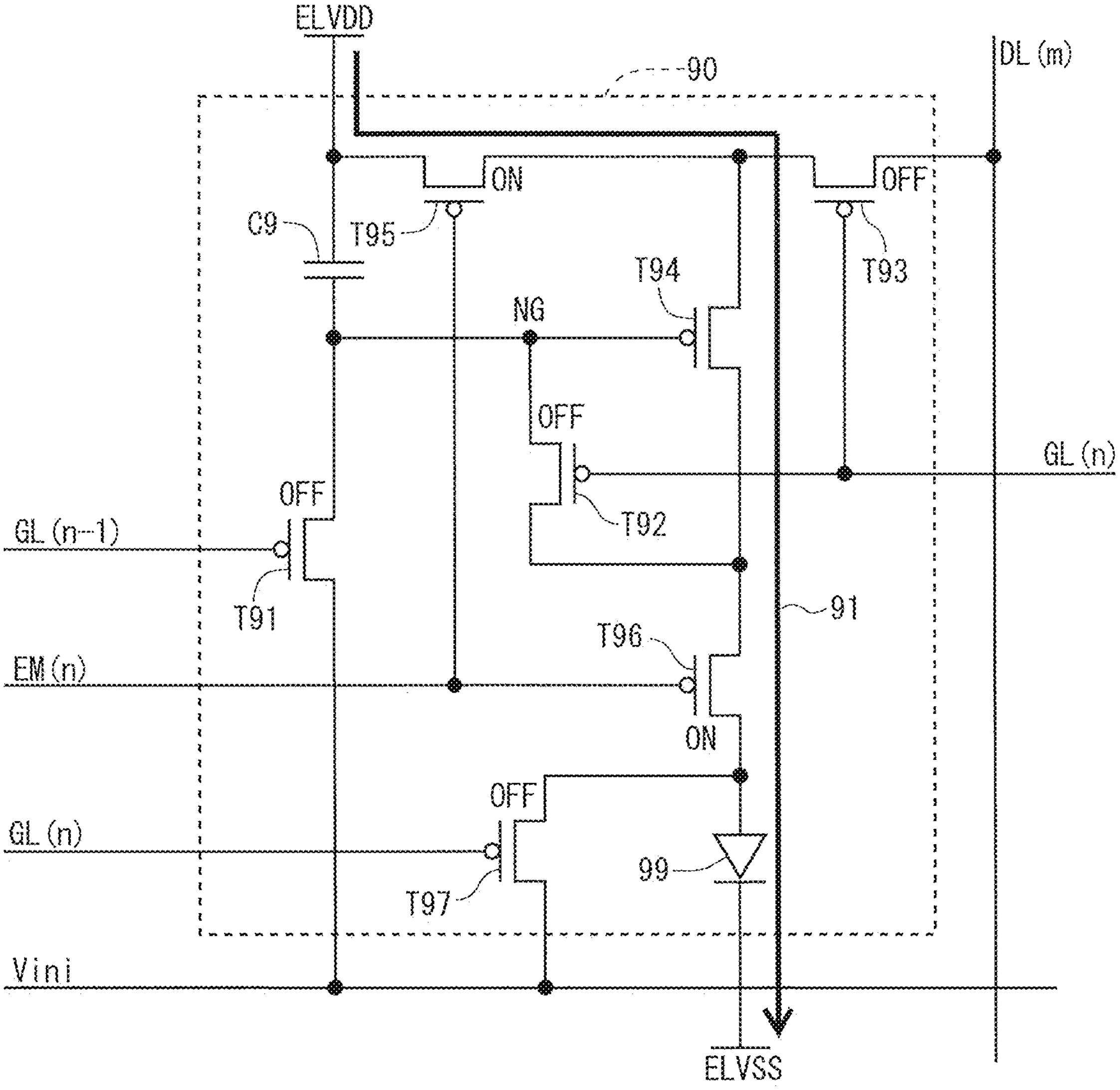
FIG. 22 is a diagram for explaining the operation of the pixel circuit illustrated in FIG. 20.
Figure 23:
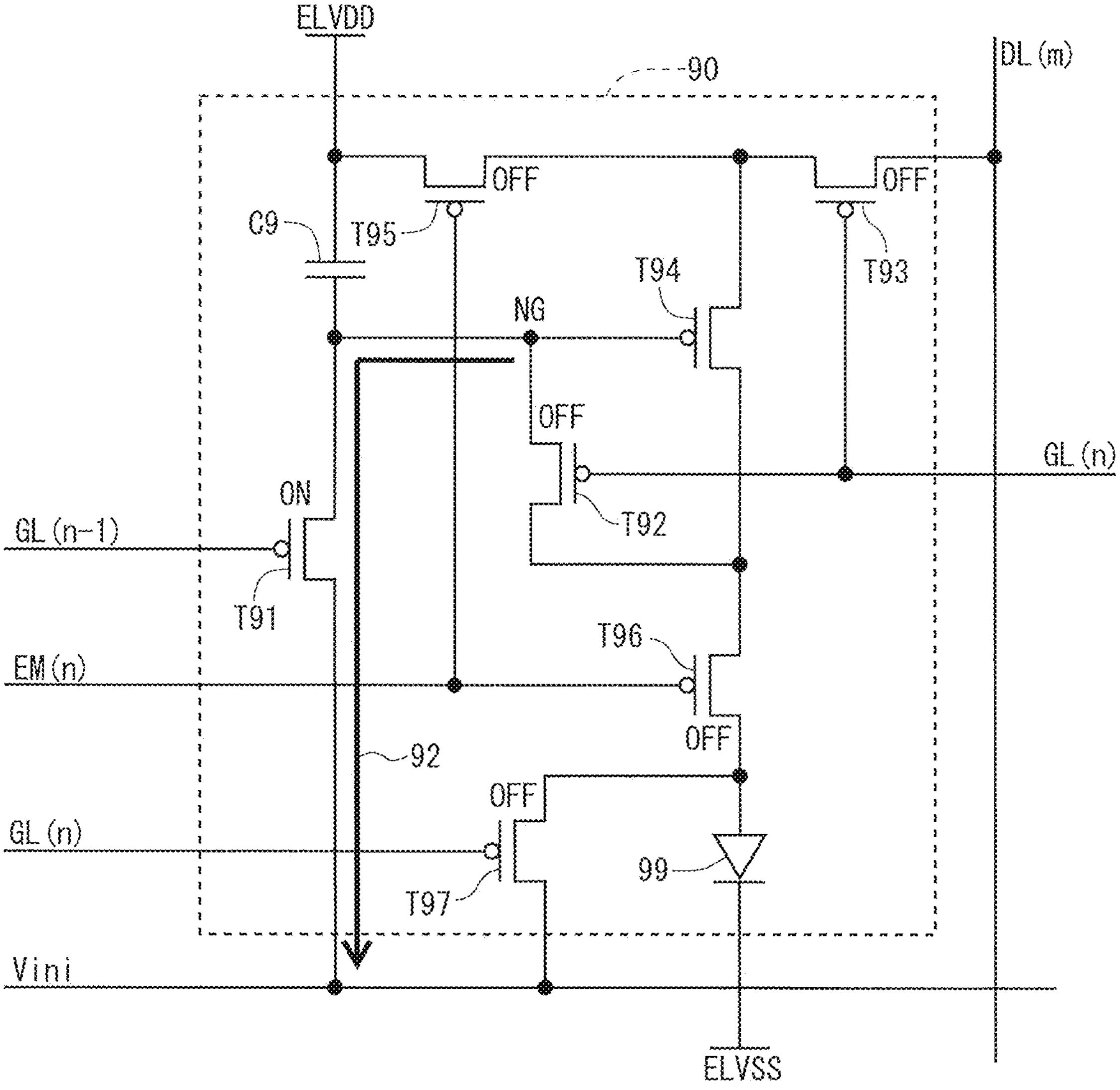
FIG. 23 is a diagram for explaining the operation of the pixel circuit illustrated in FIG. 20.
Figure 24:
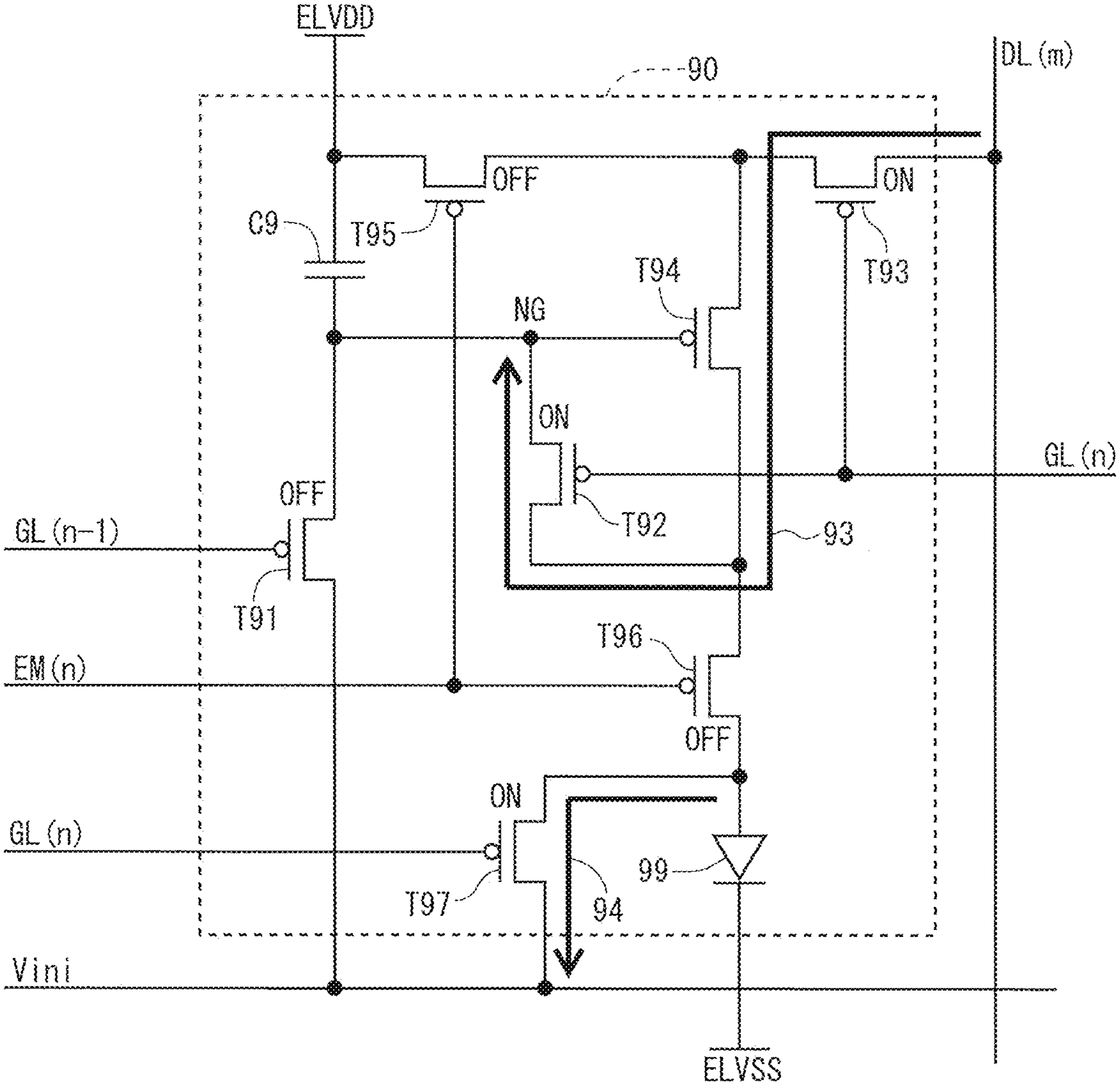
FIG. 24 is a diagram for explaining the operation of the pixel circuit illustrated in FIG. 20.

The pixel circuit 20 illustrated in FIG. 1 includes one organic EL element (organic light emitting diode) 21 as a display element, seven transistors (first initialization transistor T1, threshold voltage compensation transistor T2, write control transistor T3, drive transistor T4, power supply control transistor T5, light emission control transistor T6, and second initialization transistor T7), and one holding capacitor Cst. The organic EL element 21, the transistors T1 to T7, and the holding capacitor Cst in FIG. 1 correspond to the organic EL element 99, the transistors T91 to T97, and the holding capacitor C9 in FIG. 20, respectively. The adjustment circuit 22 illustrated in FIG. 1 includes one photodiode 220 as a light receiving element and two transistors (a photocurrent control transistor T8 and a third initialization transistor T9). The transistors T1 to T9 are P-channel transistors, and are typically LTPS-TFTs (thin film transistors having a channel layer formed of low-temperature polysilicon).

Regarding the first initialization transistor T1, a control terminal is connected to the scanning signal line GL(n−1), a first conduction terminal is connected to the drive current control node NG, and a second conduction terminal is connected to the initialization power supply line. Regarding the threshold voltage compensation transistor T2, a control terminal is connected to the scanning signal line GL(n), a first conduction terminal is connected to a second conduction terminal of the drive transistor T4 and a first conduction terminal of the light emission control transistor T6, and a second conduction terminal is connected to the drive current control node NG. Regarding the write control transistor T3, a control terminal is connected to the scanning signal line GL(n), a first conduction terminal is connected to the data signal line DL(m), and a second conduction terminal is connected to a first conduction terminal of the drive transistor T4 and a second conduction terminal of the power supply control transistor T5. Regarding the drive transistor T4, a control terminal is connected to the drive current control node NG, a first conduction terminal is connected to the second conduction terminal of the write control transistor T3 and the second conduction terminal of the power supply control transistor T5, and a second conduction terminal is connected to the first conduction terminal of the threshold voltage compensation transistor T2 and the first conduction terminal of the light emission control transistor T6.

Regarding the power supply control transistor T5, a control terminal is connected to the light emission control line EM(n), a first conduction terminal is connected to the high-level power supply line, and a second conduction terminal is connected to the second conduction terminal of the write control transistor T3 and the first conduction terminal of the drive transistor T4. Regarding the light emission control transistor T6, a control terminal is connected to the light emission control line EM(n), a first conduction terminal is connected to the first conduction terminal of the threshold voltage compensation transistor T2 and the second conduction terminal of the drive transistor T4, and a second conduction terminal is connected to a first conduction terminal of the second initialization transistor T7 and an anode terminal (first terminal) of the organic EL element 21. Regarding the second initialization transistor T7, a control terminal is connected to the scanning signal line GL(n), a first conduction terminal is connected to the second conduction terminal of the light emission control transistor T6 and the anode terminal of the organic EL element 21, and a second conduction terminal is connected to the initialization power supply line. As for the holding capacitor Cst, a first electrode is connected to the drive current control node NG, and a second electrode is connected to the high-level power supply line. Note that typically, a capacitance value of the holding capacitor Cst is larger than a capacitance value of the adjustment capacitor Cp. Regarding the organic EL element 21, the anode terminal is connected to the second conduction terminal of the light emission control transistor T6 and the first conduction terminal of the second initialization transistor T7, and a cathode terminal (second terminal) is connected to the low-level power supply line.

Regarding the photocurrent control transistor T8, a control terminal is connected to the scanning signal line GL(n), a first conduction terminal is connected to the high-level power supply line, and a second conduction terminal is connected to a cathode terminal of the photodiode 220. Regarding the third initialization transistor T9, a control terminal is connected to the scanning signal line GL(n+1), a first conduction terminal is connected to the light emission intensity adjustment node NP, and a second conduction terminal is connected to the initialization power supply line. Regarding the photodiode 220, an anode terminal is connected to the light emission intensity adjustment node NP and the cathode terminal is connected to the second conduction terminal of the photocurrent control transistor T8. As above, the circuit between the high-level power supply line and the light emission intensity adjustment node NP is configured to generate a photocurrent depending on the intensity of light incident on the photodiode 220 during a period in which the photocurrent control transistor T8 is in an on state.

Note that a drive current control node initialization transistor is realized by the first initialization transistor T1, a display initialization transistor is realized by the second initialization transistor T7, and a light intensity adjustment node initialization transistor is realized by the third initialization transistor T9. Furthermore, a light receiving circuit is realized by the photocurrent control transistor T8, the photodiode 220, and wirings connected thereto, and a light emission intensity adjustment node initialization circuit is realized by the third initialization transistor T9 and wirings connected thereto.

<1.3 Operation of Pixel Circuit and its Peripheral Circuits>

The operation of the pixel circuit 20 and its peripheral circuits illustrated in FIG. 1 will be described with reference to FIG. 3. Note that a period P01 and a period P05 correspond to a light emission period, and a period P03 corresponds to a charging period.

Figure 4:
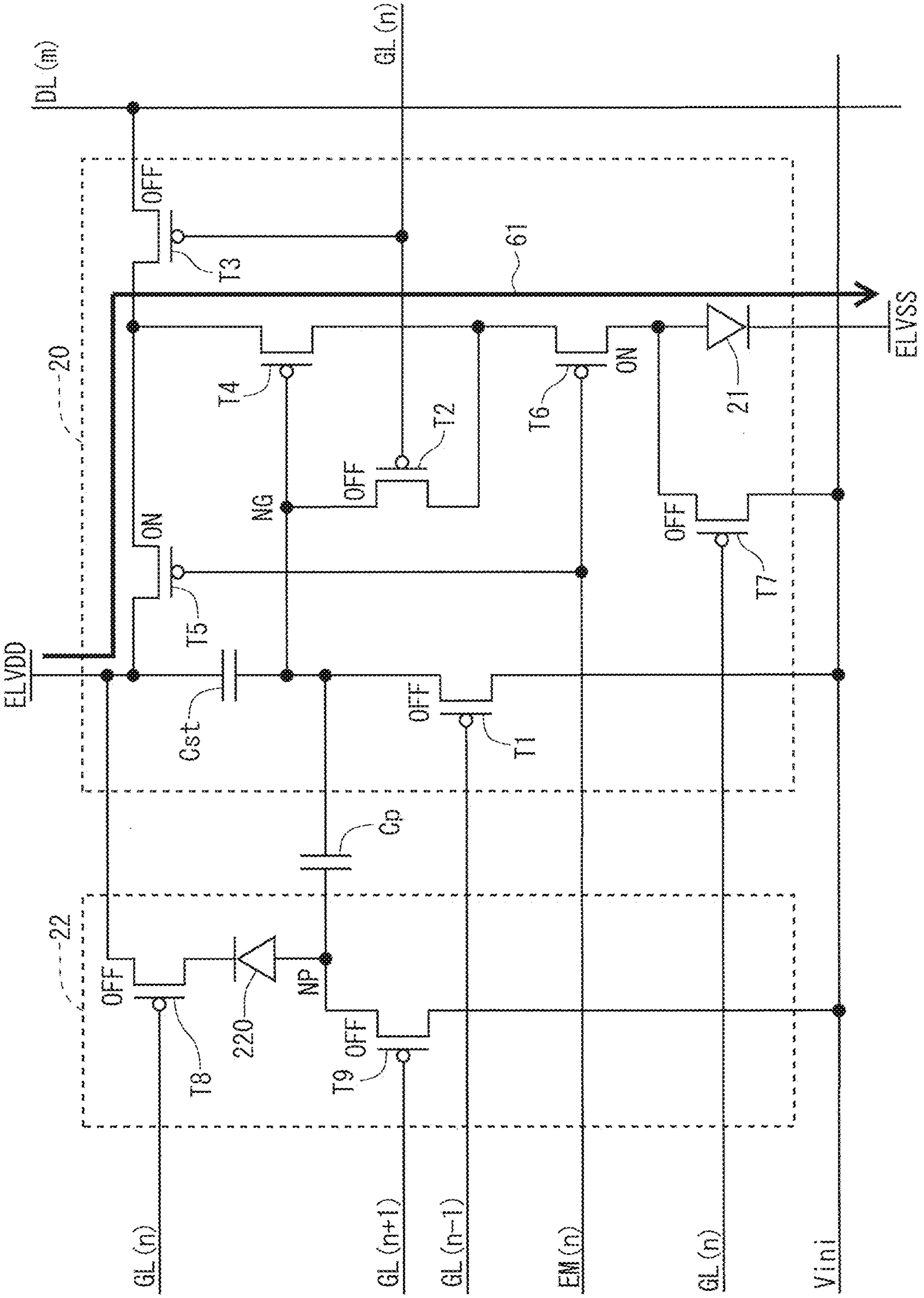
FIG. 4 is a diagram for explaining operations of the pixel circuit and its peripheral circuits in the first embodiment.

In the period P01, the scanning signal GL(n−1), the scanning signal GL(n), and the scanning signal GL(n+1) are at a high level, the light emission control signal EM(n) is at a low level, a potential of the drive current control node NG is at a level depending on writing of the data signal DL(m) in a previous frame, and a potential of the light emission intensity adjustment node NP is a potential in an initialized state. In this period, the power supply control transistor T5 and the light emission control transistor T6 are in an on state, and a drive current flows as indicated by an arrow denoted by reference character 61 in FIG. 4. As a result, the organic EL element 21 emits light depending on the magnitude of the drive current.

Figure 5:
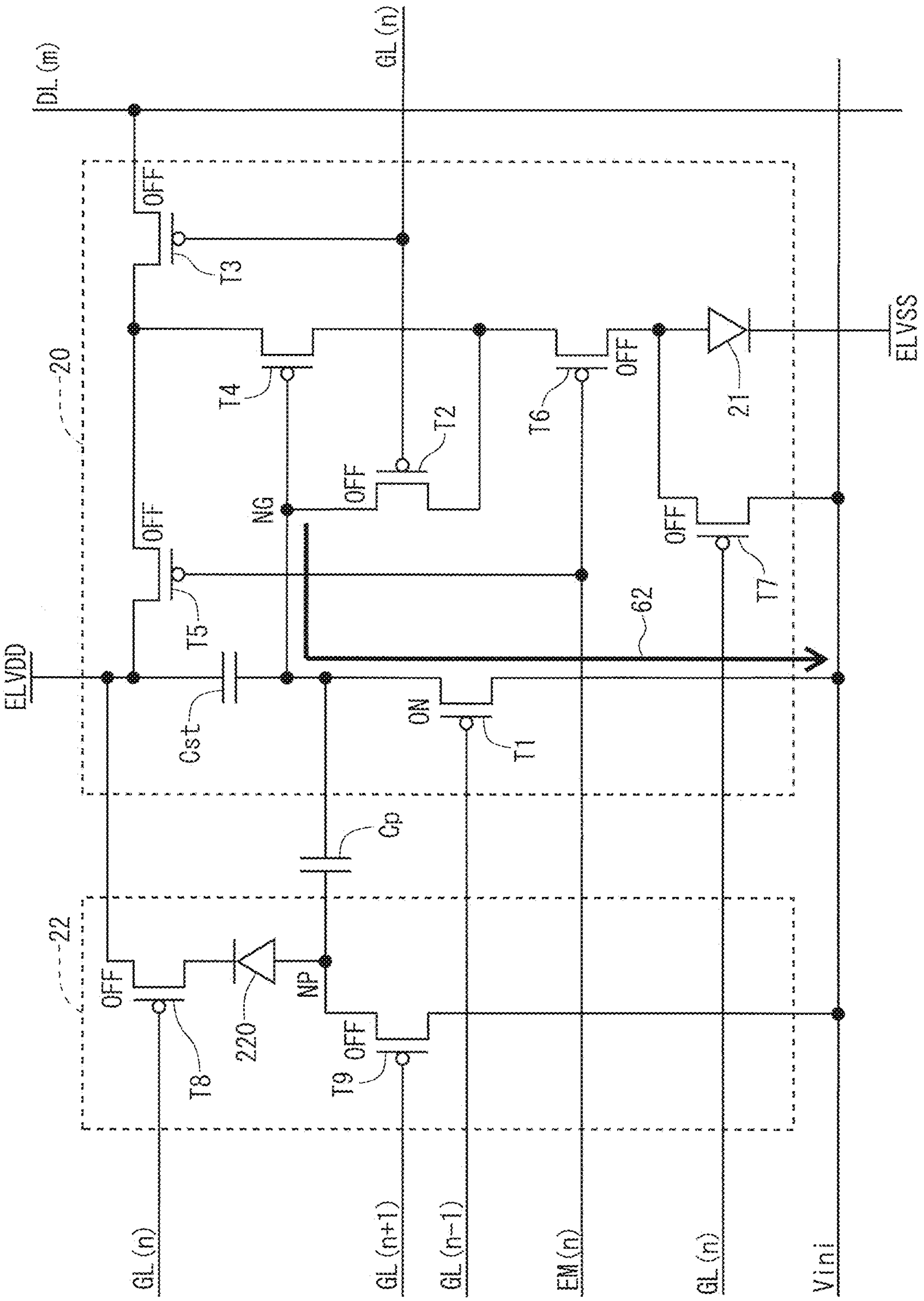
FIG. 5 is a diagram for explaining operations of the pixel circuit and its peripheral circuits in the first embodiment.

In a period P02, the light emission control signal EM(n) changes from the low level to the high level. Therefore, the power supply control transistor T5 and the light emission control transistor T6 are turned off. As a result, the supply of the current to the organic EL element 21 is cut off, and the organic EL element 21 is turned off. Furthermore, in the period P02, the scanning signal GL(n−1) changes from the high level to the low level, so that the first initialization transistor T1 goes into an on state. As a result, as indicated by an arrow denoted by reference character 62 in FIG. 5, the potential of the drive current control node NG is initialized based on the initialization potential Vini.

Figure 6:
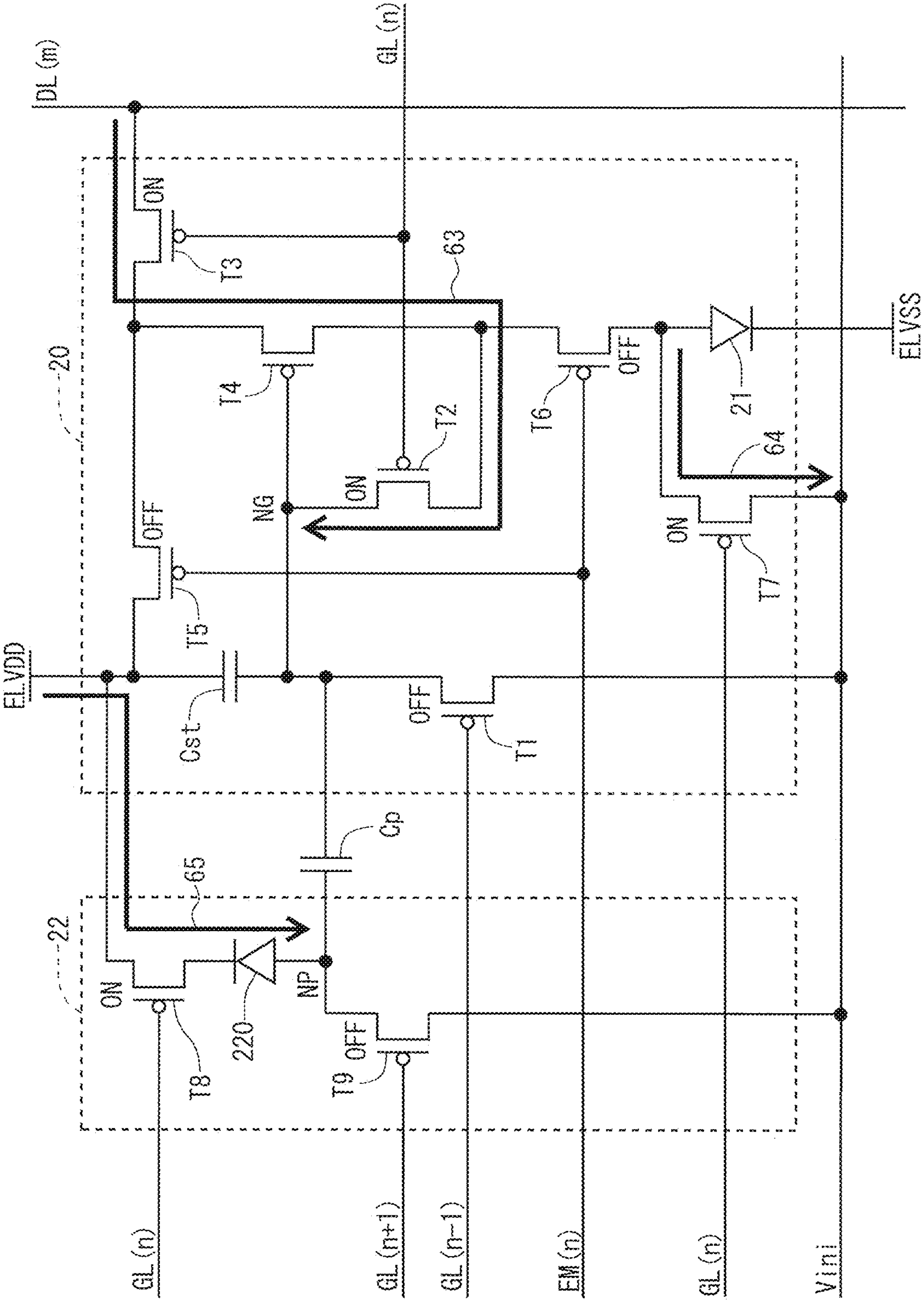
FIG. 6 is a diagram for explaining operations of the pixel circuit and its peripheral circuits in the first embodiment.

In the period P03, the scanning signal GL(n−1) changes from the low level to the high level. As a result, the first initialization transistor T1 is turned off. Furthermore, in the period P03, the scanning signal GL(n) changes from the high level to the low level. As a result, the threshold voltage compensation transistor T2, the write control transistor T3, the second initialization transistor T7, and the photocurrent control transistor T8 are turned on. When the threshold voltage compensation transistor T2 and the write control transistor T3 are turned on, the data signal DL(m) is provided to the drive current control node NG via the write control transistor T3, the drive transistor T4, and the threshold voltage compensation transistor T2, as indicated by an arrow denoted by reference character 63 in FIG. 6. At this time, when a gate-source voltage of the drive transistor T4 becomes equal to a threshold voltage of the drive transistor T4, the drive transistor T4 is turned off. That is, the potential of the drive current control node NG is equal to the sum of a source potential of the drive transistor T4 and the threshold voltage of the drive transistor T4. In this manner, the drive current control node NG is charged based on the data signal DL(m), and the threshold voltage of the drive transistor T4 is compensated for. Furthermore, when the second initialization transistor T7 is turned on, the anode potential of the organic EL element 21 is initialized based on the initialization potential Vini as indicated by an arrow denoted by reference character 64 in FIG. 6. Furthermore, when the photocurrent control transistor T8 is turned on, as indicated by an arrow denoted by reference character 65 in FIG. 6, a current (photocurrent) depending on the intensity of light (that is, external light) incident on the photodiode 220 flows from the high-level power supply line to the light emission intensity adjustment node NP via the photocurrent control transistor T8 and the photodiode 220. As a result, the light emission intensity adjustment node NP is charged. In this regard, as the intensity of external light is higher, an amount of photocurrent is larger, and the potential of the light emission intensity adjustment node NP is greatly increased.

Figure 7:
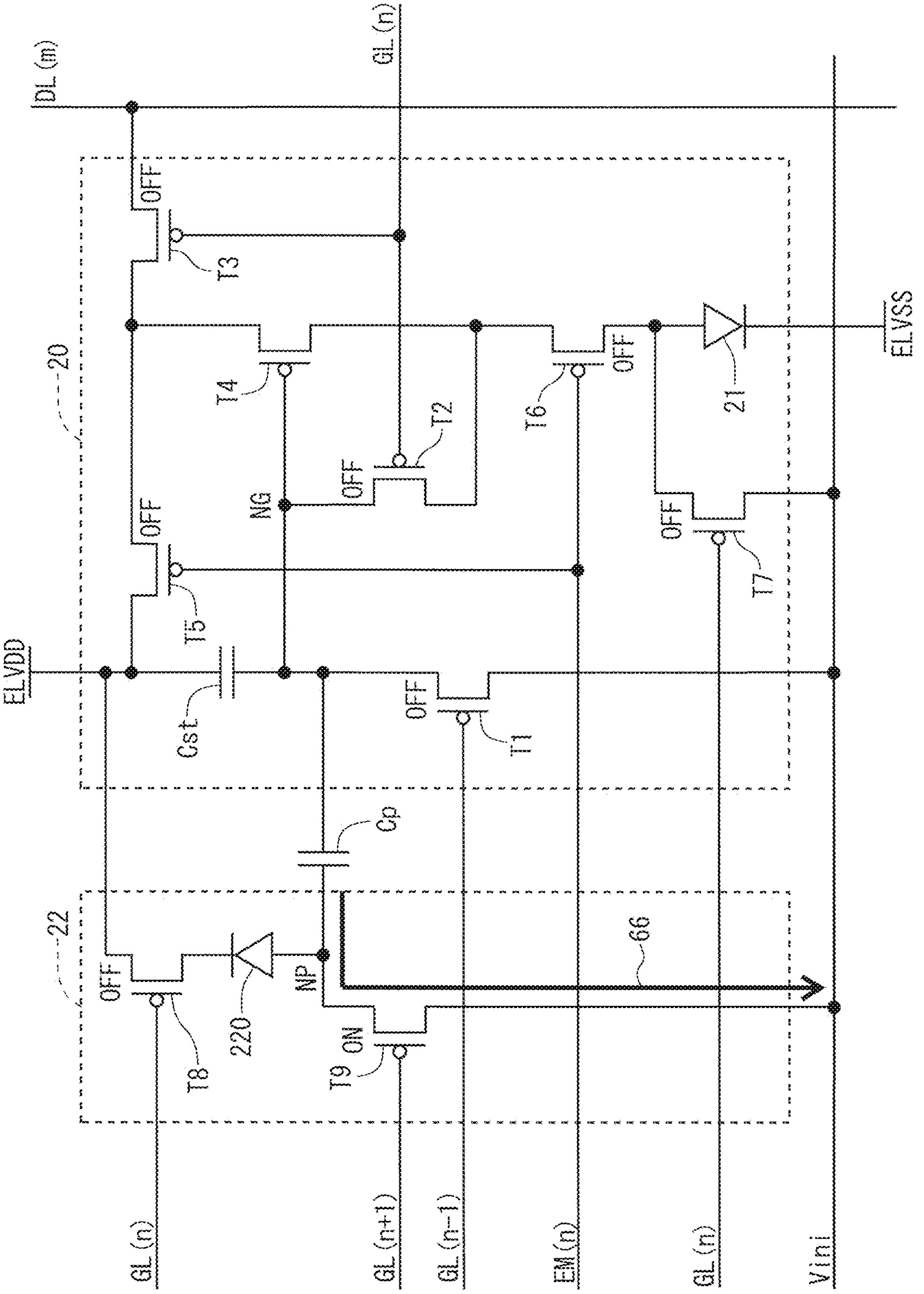
FIG. 7 is a diagram for explaining operations of the pixel circuit and its peripheral circuits in the first embodiment.

In a period P04, the scanning signal GL(n) changes from the low level to the high level. As a result, the threshold voltage compensation transistor T2, the write control transistor T3, the second initialization transistor T7, and the photocurrent control transistor T8 are turned off. Furthermore, in the period P04, the scanning signal GL(n+1) changes from the high level to the low level. As a result, the third initialization transistor T9 is turned on, and the potential of the light emission intensity adjustment node NP is initialized based on the initialization potential Vini as indicated by an arrow denoted by reference character 66 in FIG. 7. Meanwhile, the initialization potential Vini is set to a potential lower than the high-level power supply potential ELVDD in the present embodiment, and in the period P03, the light emission intensity adjustment node NP is charged, so that the potential of the light emission intensity adjustment node NP is lower than the high-level power supply potential ELVDD and higher than the initialization potential Vini. Therefore, when the potential of the light emission intensity adjustment node NP is initialized based on the initialization potential Vini in the period P04, the potential of the light emission intensity adjustment node NP decreases. As a result, the potential of the drive current control node NG also decreases via the adjustment capacitor Cp.

In the period P05, the scanning signal GL(n+1) changes from the low level to the high level. As a result, the third initialization transistor T9 is turned off. Furthermore, in the period P05, the light emission control signal EM(n) changes from the high level to the low level. As a result, the power supply control transistor T5 and the light emission control transistor T6 are turned on, and a drive current flows as indicated by an arrow denoted by reference character 61 in FIG. 4. That is, the organic EL element 21 emits light depending on the magnitude of the drive current.

By each pixel circuit 20 in the display unit 200 operating as described above, an image based on the input image signal DIN is displayed on the display unit 200. Furthermore, in the period P03, as the intensity of external light is higher, the potential of the light emission intensity adjustment node NP greatly increases. Then, the potential of the drive current control node NG decreases in the period P04 depending on the degree of increase in the potential of the light emission intensity adjustment node NP in the period P03. That is, as the intensity of the external light is higher, a larger amount of drive current than the original amount is supplied to the organic EL element 21. In this way, visibility under external light is improved.

Note that the sizes of the photodiode 220 and the adjustment capacitor Cp need to be appropriately designed so that good visibility can be obtained by suitably decreasing the potential of the light emission intensity adjustment node NP in the period P04 depending on the intensity of the external light.

In the present embodiment, the scanning signal GL(n−1), the scanning signal GL(n), and the scanning signal GL(n+1) are sequentially set to the low level for each predetermined period in a period in which the light emission control signal EM(n) is maintained at the high level. In other words, during the period in which the emission driver 400 maintains the nth light emission control line in the non-selected state, the gate driver 300 sequentially brings the (n−1)th scanning signal line, the nth scanning signal line, and the (n+1)th scanning signal line into the selected state for each predetermined period. The gate control signal GCTL is transmitted from the display control circuit 100 to the gate driver 300 and the emission driver control signal EMCTL is transmitted from the display control circuit 100 to the emission driver 400 such that above operation is performed.

Note that, in the present embodiment, a step of stopping supply of the drive current is realized by the operation at the time of transition from the period P01 to the period P02, a step of charging the drive current control node and generating the photocurrent depending on intensity of light is realized by the operation in the period P03, a step of initializing the light emission intensity adjustment node is realized by the operation in the period P04, and a step of resuming the supply of the drive current is realized by the operation at the time of transition from the period P04 to the period P05.

<1.4 Effects>

According to the present embodiment, the adjustment circuit 22 that adjusts the amount of the drive current supplied to the organic EL element 21 in the pixel circuit 20 is provided. When the drive current control node NG in the pixel circuit 20 is charged on the basis of the data signal, the potential of the light emission intensity adjustment node NP in the adjustment circuit 22 increases depending on the intensity of the external light. Thereafter, before the light emission period starts, by initializing the light emission intensity adjustment node NP, the potential of the drive current control node NG decreases as the potential of the light emission intensity adjustment node NP decreases. As a result, a larger amount of drive current than the original amount is supplied to the organic EL element 21 depending on the intensity of the external light, and visibility under the external light is improved.

Meanwhile, the photodiode 220 in the adjustment circuit 22 is not directly connected to the drive transistor T4 and the organic EL element 21. Therefore, unlike the organic EL display device disclosed in Japanese Laid-Open Patent Publication No. 2005-92006, an unintended current does not flow through the organic EL element 21 during the light emission period. Furthermore, the photodiode 220 generates a photocurrent only during a period in which the organic EL element 21 corresponding thereto is in a turn-off state. Therefore, the intensity of the external light is detected without being affected by the light emission of the organic EL element 21. As a result, the amount of the drive current can be accurately adjusted. Moreover, since the adjustment circuit 22 is provided for each pixel circuit 20, the amount of the drive current can be adjusted with high accuracy. From the above, the visibility under the external light is effectively improved without causing deterioration in display quality.

Furthermore, according to the present embodiment, since the potential of the drive current control node NG is controlled depending on the intensity of the external light, it is not necessary to perform calculation processing for adjusting the length of the light emission period and the data voltage (value of the data signal) outside the panel, for example. That is, unlike the organic EL display device disclosed in Japanese Laid-Open Patent Publication No. 2008-176115, it is not necessary to provide a control system or a control chip outside the panel. Moreover, in a case where the method of changing the data voltage depending on the intensity of the external light is adopted, a special system or chip capable of changing the data voltage in a wide range is required. However, according to the present embodiment, since it is not necessary to change the data voltage, the special system or chip is unnecessary.

As above, according to the present embodiment, with respect to the organic EL display device, the visibility in an environment where external light is strong is improved while a decrease in display quality and an increase in cost are suppressed.

<1.5 Modification>

Figure 8:
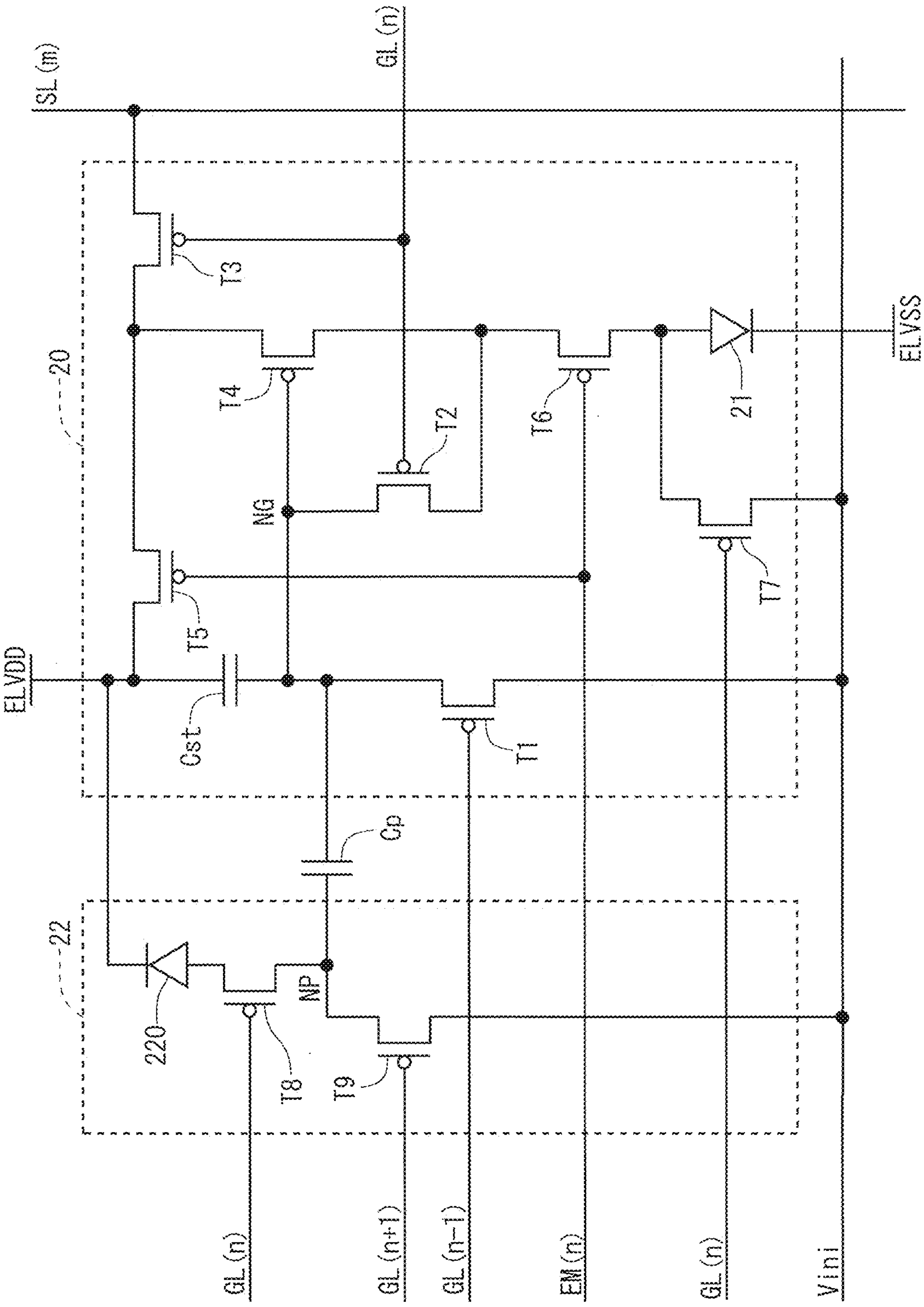
FIG. 8 is a circuit diagram illustrating a configuration of a pixel circuit of an nth row and an mth column and its peripheral circuits in a modification of the first embodiment.

Regarding the configuration of the adjustment circuit 22, in the first embodiment, the photodiode 220 is provided between the photocurrent control transistor T8 and the light emission intensity adjustment node NP. However, it is not limited thereto, and the photodiode 220 may be provided between the high-level power supply line and the photocurrent control transistor T8 as illustrated in FIG. 8. Also in such a configuration, the pixel circuit 20 and the adjustment circuit 22 operate similarly to the first embodiment.

2. Second Embodiment

<2.1 Outline and the Like>

In the first embodiment, all the transistors in the pixel circuit 20 and all the transistors in the adjustment circuit 22 are P-channel transistors (typically, LTPS-TFTs). On the other hand, in the present embodiment, the transistors in the pixel circuit 20 include a P-channel transistor and an N-channel transistor, and all the transistors in the adjustment circuit 22 are N-channel transistors. The P-channel transistor is typically an LTPS-TFT, and the N-channel transistor is typically an IGZO-TFT (thin film transistor having a channel layer formed by oxide semiconductor including indium, gallium, zinc, and oxygen).

Figure 9:
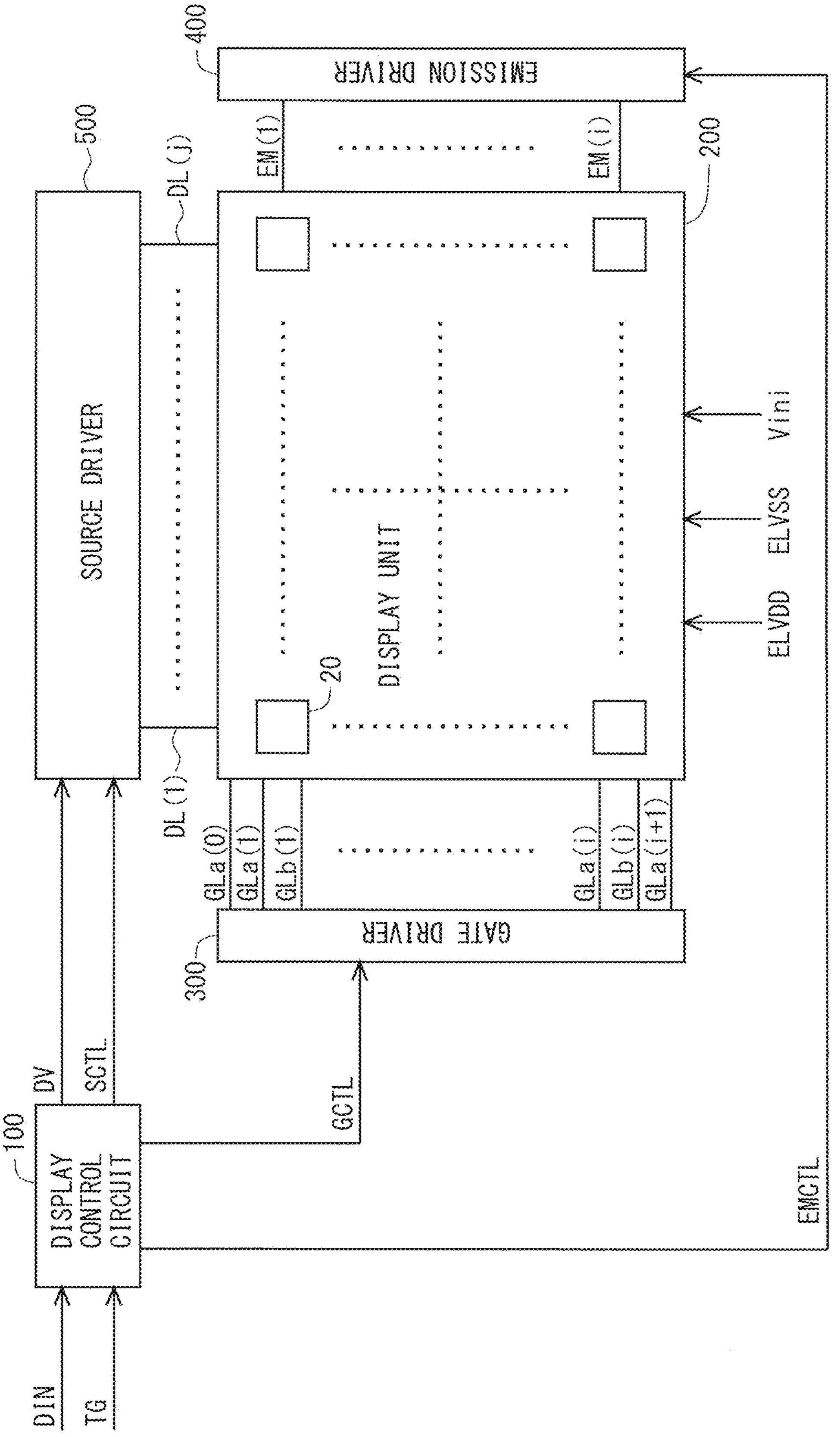
FIG. 9 is a block diagram illustrating an overall configuration of an organic EL display device according to a second embodiment.

The overall configuration is substantially similar to that of the first embodiment. However, in the present embodiment, the display unit 200 is provided with, as scanning signal lines, first scanning signal lines that control a state of the P-channel transistor in the pixel circuit 20, and second scanning signal lines that control a state of the N-channel transistor in the pixel circuit 20 and the N-channel transistor in the adjustment circuit 22. Specifically, in the display unit 200, (i+2) first scanning signal lines GLa(0) to GLa(i+1) and i second scanning signal lines GLb(1) to GLb(i) are disposed as scanning signal lines (see FIG. 9). The gate driver 300 selectively drives the first scanning signal lines GLa(0) to GLa(i+1) sequentially and selectively drives the second scanning signal lines GLb(1) to GLb(i) sequentially.

<2.2 Configuration of Pixel Circuit and its Peripheral Circuits>

Figure 10:
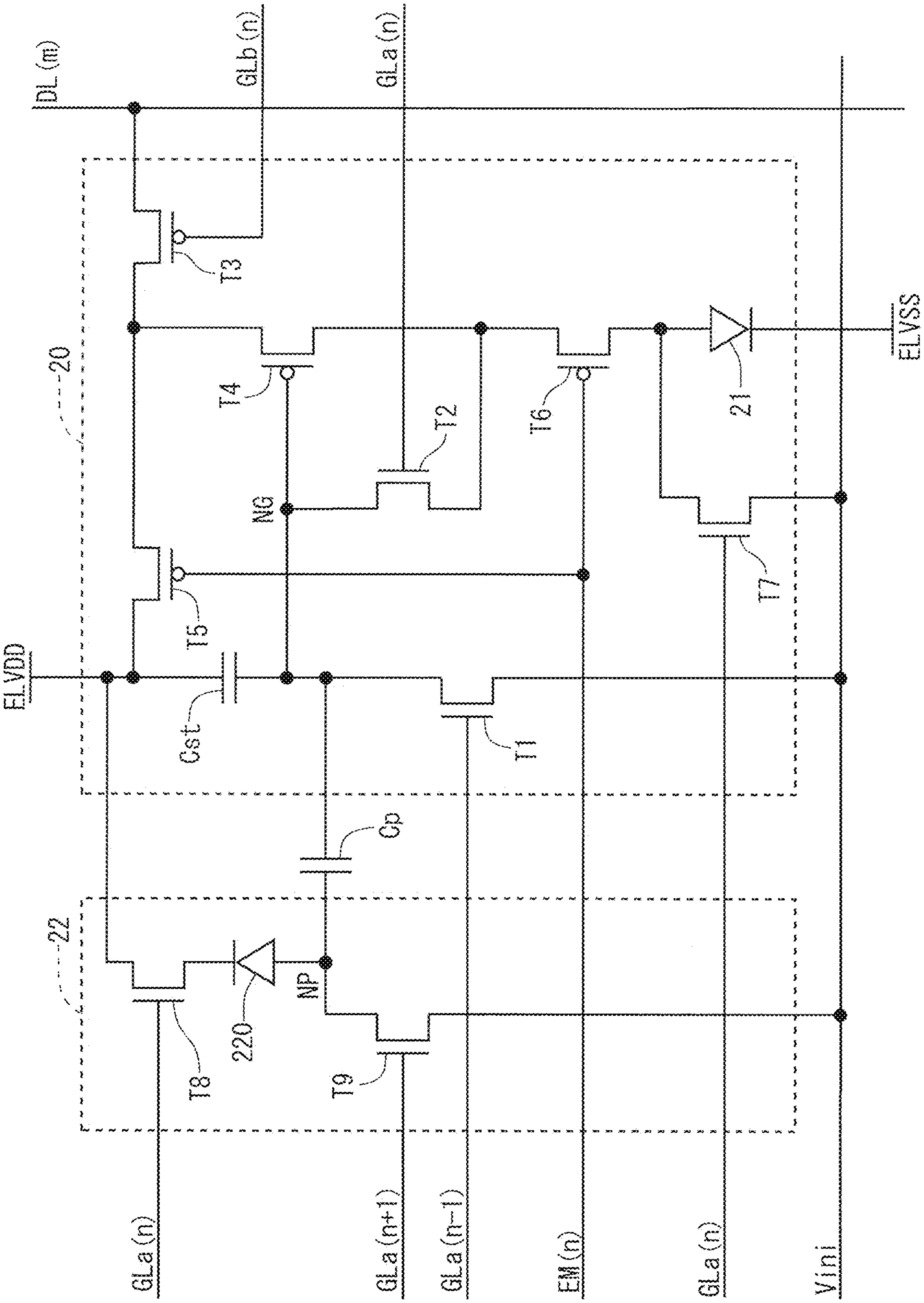
FIG. 10 is a circuit diagram illustrating a configuration of a pixel circuit of an nth row and an mth column and its peripheral circuits in the second embodiment.

FIG. 10 is a circuit diagram illustrating a configuration of a pixel circuit 20 of an nth row and an mth column and its peripheral circuits in the present embodiment. Unlike the first embodiment, the first initialization transistor T1, the threshold voltage compensation transistor T2, the second initialization transistor T7, the photocurrent control transistor T8, and the third initialization transistor T9 are N-channel transistors. The control terminal of the first initialization transistor T1 is connected to the first scanning signal line GLa(n−1). The control terminal of the threshold voltage compensation transistor T2 is connected to the first scanning signal line GLa(n). The control terminal of the write control transistor T3 is connected to the second scanning signal line GLb(n). The control terminal of the second initialization transistor T7 is connected to the first scanning signal line GLa(n). The control terminal of the photocurrent control transistor T8 is connected to the first scanning signal line GLa(n). The control terminal of the third initialization transistor T9 is connected to the first scanning signal line GLa(n+1). The other points are the same as those of the first embodiment. Note that, as in the modification of the first embodiment, the photodiode 220 may be provided between the high-level power supply line and the photocurrent control transistor T8.

<2.3 Operation of Pixel Circuit and its Peripheral Circuit>

Figure 11:
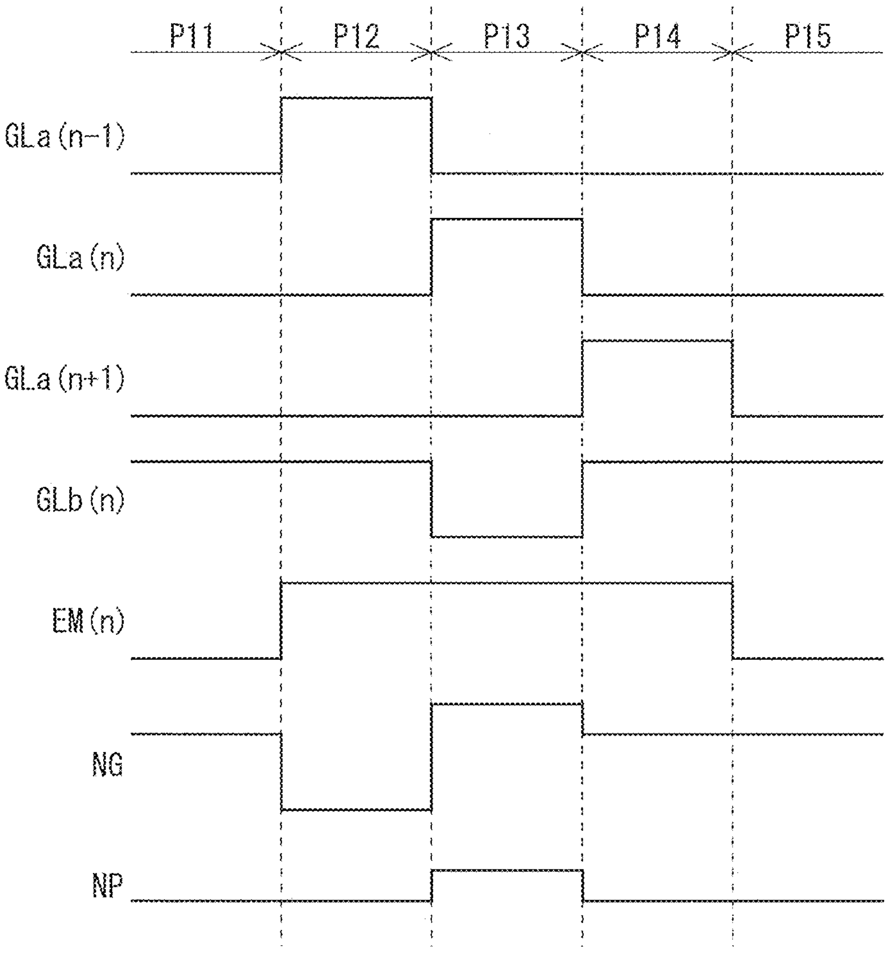
FIG. 11 is a timing chart for explaining operations of the pixel circuit and its peripheral circuits in the second embodiment.

The operation of the pixel circuit 20 and its peripheral circuits illustrated in FIG. 10 will be described with reference to FIG. 11. Note that a period P11 and a period P15 correspond to a light emission period, and a period P13 corresponds to a charging period.

In the period P11, the first scanning signal GLa(n−1), the first scanning signal GLa(n), and the first scanning signal GLa(n+1) are at a low level, the second scanning signal GLb(n) is at a high level, the light emission control signal EM(n) is at a low level, a potential of the drive current control node NG is at a level depending on the writing of the data signal DL(m) in a previous frame, and a potential of the light emission intensity adjustment node NP is a potential in an initialized state. In this period, the power supply control transistor T5 and the light emission control transistor T6 are in an on state, and the organic EL element 21 emits light depending on the magnitude of the drive current.

In a period P12, the light emission control signal EM(n) changes from the low level to a high level. Therefore, the power supply control transistor T5 and the light emission control transistor T6 are turned off. As a result, the supply of the current to the organic EL element 21 is cut off, and the organic EL element 21 is turned off. Furthermore, in the period P12, the first scanning signal GLa(n−1) changes from the low level to the high level, so that the first initialization transistor T1 goes into an on state. As a result, the potential of the drive current control node NG is initialized based on the initialization potential Vini.

In the period P13, the first scanning signal GLa(n−1) changes from the high level to the low level. As a result, the first initialization transistor T1 is turned off. Furthermore, in the period P13, the first scanning signal GLa(n) changes from the low level to the high level, and the second scanning signal GLb(n) changes from the high level to the low level. As a result, the threshold voltage compensation transistor T2, the write control transistor T3, the second initialization transistor T7, and the photocurrent control transistor T8 are turned on. When the threshold voltage compensation transistor T2 and the write control transistor T3 are turned on, the data signal DL(m) is provided to the drive current control node NG via the write control transistor T3, the drive transistor T4, and the threshold voltage compensation transistor T2. Furthermore, when the second initialization transistor T7 is turned on, the anode potential of the organic EL element 21 is initialized based on the initialization potential Vini. Furthermore, when the photocurrent control transistor T8 is turned on, a current (photocurrent) depending on the intensity of light (that is, external light) incident on the photodiode 220 flows from the high-level power supply line to the light emission intensity adjustment node NP via the photocurrent control transistor T8 and the photodiode 220. As a result, the light emission intensity adjustment node NP is charged.

In a period P14, the first scanning signal GLa(n) changes from the high level to the low level, and the second scanning signal GLb(n) changes from the low level to the high level. As a result, the threshold voltage compensation transistor T2, the write control transistor T3, the second initialization transistor T7, and the photocurrent control transistor T8 are turned off. Furthermore, in the period P14, the first scanning signal GLa(n+1) changes from the low level to the high level. As a result, the third initialization transistor T9 is turned on, and the potential of the light emission intensity adjustment node NP is initialized based on the initialization potential Vini. At this time, as in the first embodiment, the potential of the light emission intensity adjustment node NP decreases. As a result, the potential of the drive current control node NG also decreases via the adjustment capacitor Cp.

In the period P15, the first scanning signal GLa(n+1) changes from the high level to the low level. As a result, the third initialization transistor T9 is turned off. Furthermore, in the period P15, the light emission control signal EM(n) changes from the high level to the low level. As a result, the power supply control transistor T5 and the light emission control transistor T6 are turned on, and the organic EL element 21 emits light depending on the magnitude of the drive current.

In the present embodiment, the first scanning signal GLa(n−1), the first scanning signal GLa(n), and the first scanning signal GLa(n+1) are sequentially set to the high level for each predetermined period in a period in which the light emission control signal EM(n) is maintained at the high level. In other words, during the period in which the emission driver 400 maintains the nth light emission control line in the non-selected state, the gate driver 300 sequentially brings the (n−1)th first scanning signal line, the nth first scanning signal line, and the (n+1)th first scanning signal line into the selected state for each predetermined period. The gate control signal GCTL is transmitted from the display control circuit 100 to the gate driver 300 and the emission driver control signal EMCTL is transmitted from the display control circuit 100 to the emission driver 400 such that above operation is performed. Furthermore, the second scanning signal GLb(n) is at the low level during a period in which the first scanning signal GLa(n) is at the high level. In other words, the gate driver 300 puts the nth second scanning signal line into the selected state during the period in which the nth first scanning signal line is in the selected state.

<2.4 Effects>

According to the present embodiment, with respect to the organic EL display device employing the pixel circuit 20 including the N-channel transistor and the P-channel transistor, similarly to the first embodiment, visibility in an environment where external light is strong is improved while degradation in display quality and an increase in cost are suppressed. Furthermore, since charge leakage is suppressed by adopting the IGZO-TFT as the N-channel transistor, it is possible to perform low-frequency driving. As a result, the power consumption is remarkably reduced.

3. Third Embodiment

<3.1 Outline and the Like>

In the first embodiment, all the transistors in the pixel circuit 20 and all the transistors in the adjustment circuit 22 are P-channel transistors. In the second embodiment, the transistors in the pixel circuit 20 include a P-channel transistor and an N-channel transistor, and all the transistors in the adjustment circuit 22 are N-channel transistors. On the other hand, in the present embodiment, all the transistors in the pixel circuit 20 and all the transistors in the adjustment circuit 22 are N-channel transistors (typically, IGZO-TFTs).

The overall configuration is substantially similar to that of the first embodiment. However, in the present embodiment, a first initialization potential Vini1 and a second initialization potential Vini2 are used as the initialization potentials. Hereinafter, a power supply line that supplies the first initialization potential Vini1 is referred to as a "first initialization power supply line", and a power supply line that supplies the second initialization potential Vini2 is referred to as a "second initialization power supply line". Typically, the first initialization potential Vini1 is a potential higher than the high-level power supply potential ELVDD, and the second initialization potential Vini2 is a potential lower than the low-level power supply potential ELVSS.

<3.2 Configuration of Pixel Circuit and its Peripheral Circuits>

Figure 12:
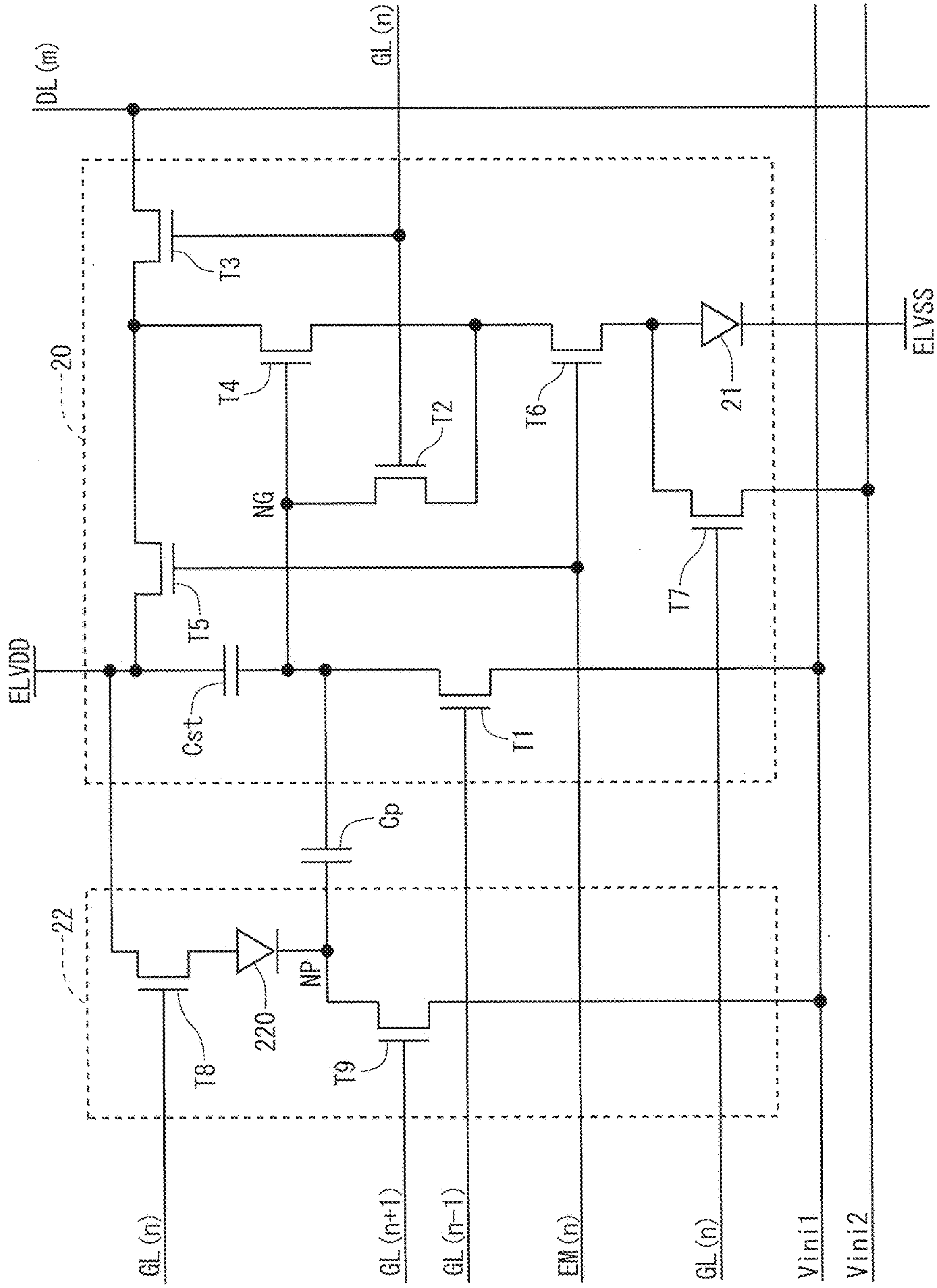
FIG. 12 is a circuit diagram illustrating a configuration of a pixel circuit of an nth row and an mth column and its peripheral circuits in a third embodiment.

FIG. 12 is a circuit diagram illustrating a configuration of a pixel circuit 20 of an nth row and an mth column and its peripheral circuits in the present embodiment. As described above, the transistors T1 to T7 in the pixel circuit 20 and the transistors T8 and T9 in the adjustment circuit 22 are all N-channel transistors.

The second conduction terminal of the first initialization transistor connected to the first initialization power supply line. The second conduction terminal of the second initialization transistor T7 is connected to the second initialization power supply line. The second conduction terminal of the third initialization transistor T9 is connected to the first initialization power supply line. As for the photodiode 220, the anode terminal is connected to the second conduction terminal of the photocurrent control transistor T8 and the cathode terminal is connected to the light emission intensity adjustment node NP. Note that, as in the modification of the first embodiment, the photodiode 220 may be provided between the high-level power supply line and the photocurrent control transistor T8.

<3.3 Operation of Pixel Circuit and its Peripheral Circuits>

Figure 13:
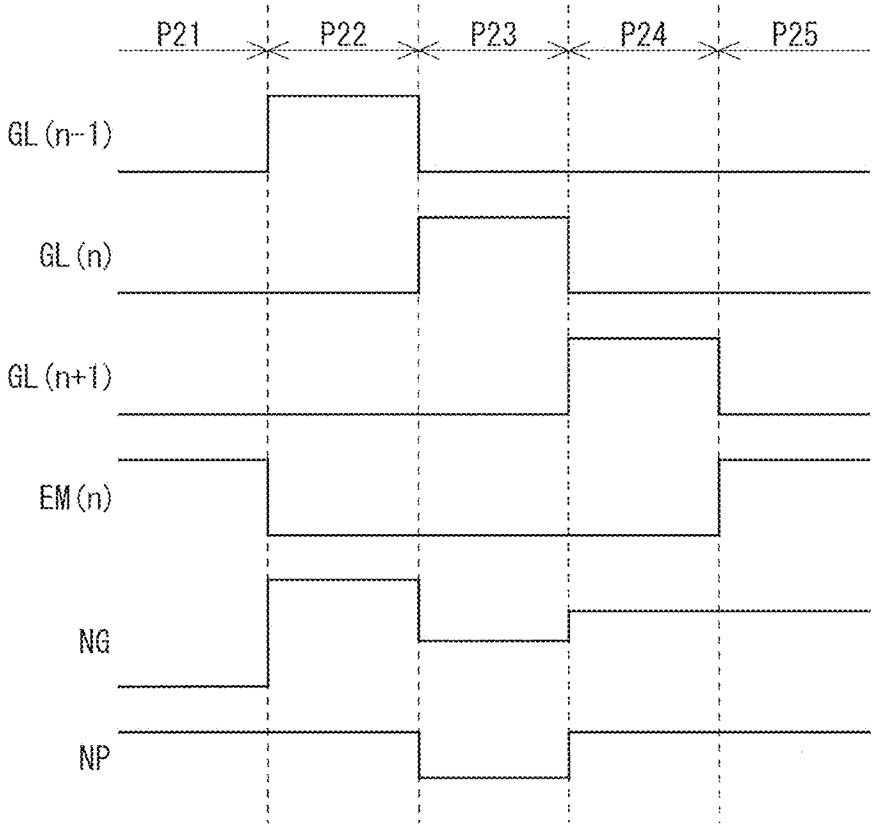
FIG. 13 is a timing chart for explaining operations of the pixel circuit and its peripheral circuits in the third embodiment.

The operation of the pixel circuit 20 and its peripheral circuits illustrated in FIG. 12 will be described with reference to FIG. 13. Note that a period P21 and a period P25 correspond to a light emission period, and a period P23 corresponds to a charging period.

Figure 14:
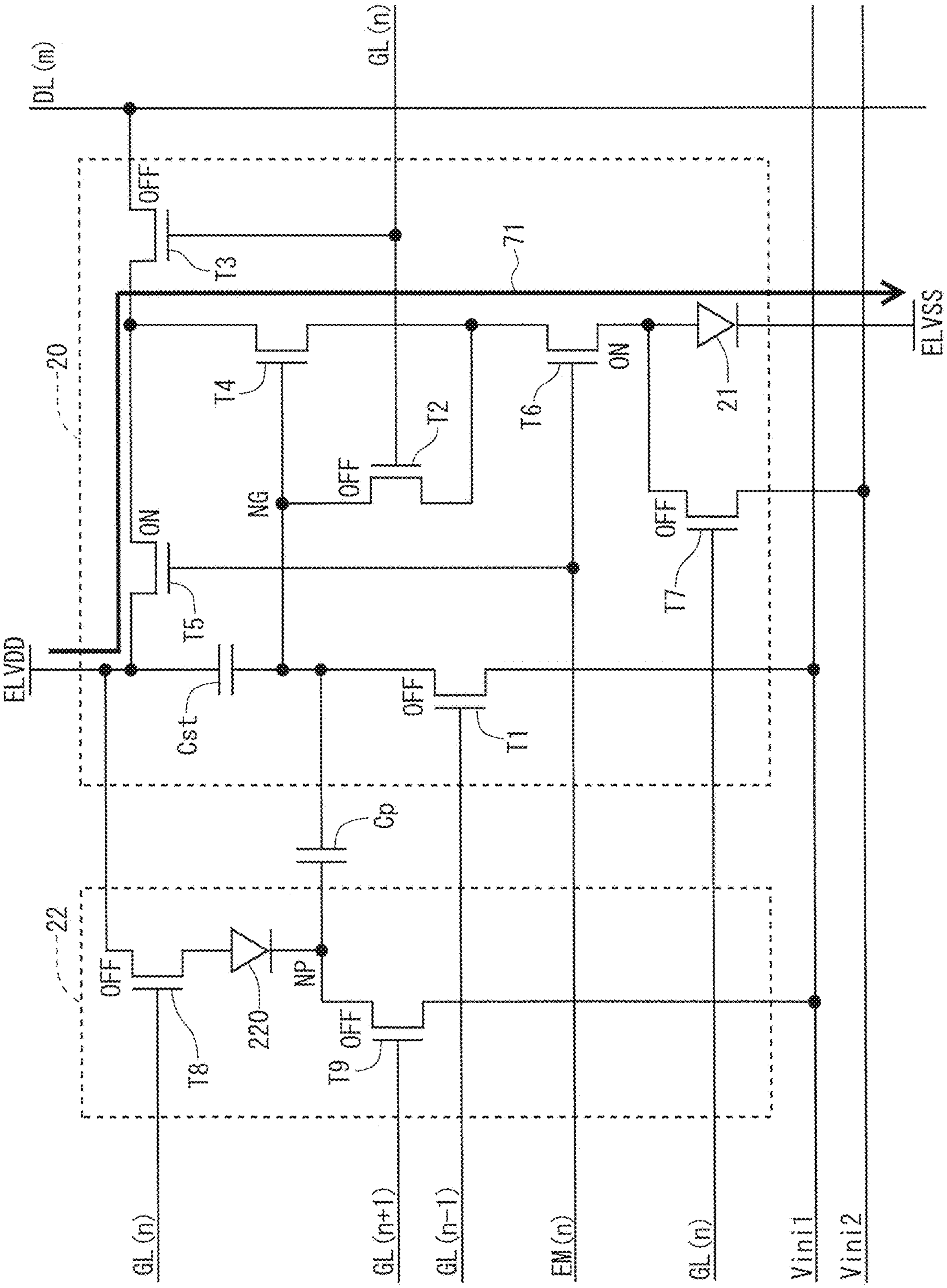
FIG. 14 is a diagram for explaining operations of the pixel circuit and its peripheral circuits in the third embodiment.

In the period P21, the scanning signal GL(n−1), the scanning signal GL(n), and the scanning signal GL(n+1) are at a low level, the light emission control signal EM(n) is at a high level, a potential of the drive current control node NG is at a level depending on the writing of the data signal DL(m) in a previous frame, and a potential of the light emission intensity adjustment node NP is a potential in a state initialized based on the first initialization potential Vini1. In this period, the power supply control transistor T5 and the light emission control transistor T6 are in an on state, and a drive current flows as indicated by an arrow denoted by reference character 71 in FIG. 14. As a result, the organic EL element 21 emits light depending on the magnitude of the drive current.

Figure 15:
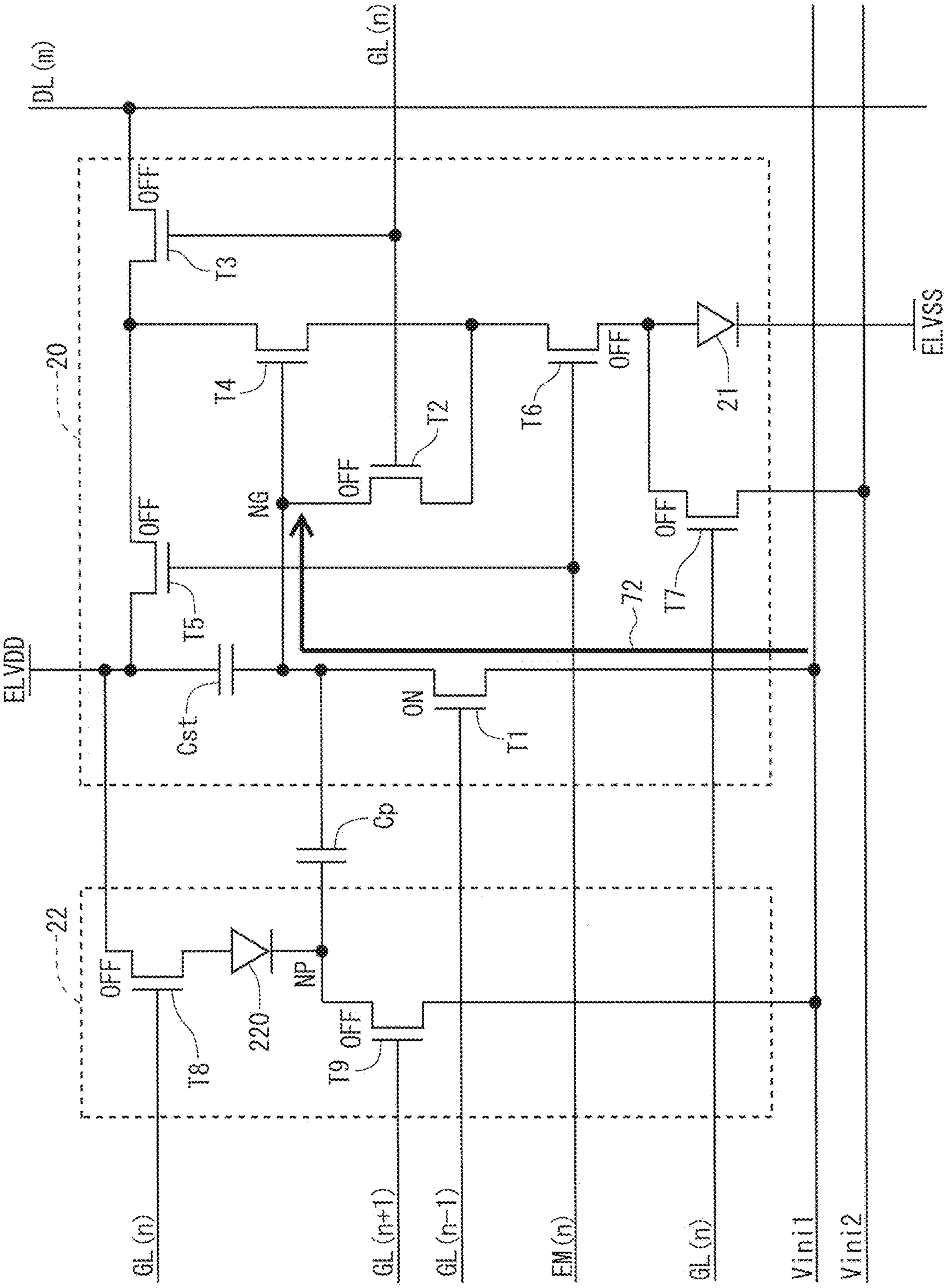
FIG. 15 is a diagram for explaining operations of the pixel circuit and its peripheral circuits in the third embodiment.

In a period P22, the light emission control signal EM(n) changes from the high level to the low level. Therefore, the power supply control transistor T5 and the light emission control transistor T6 are turned off. As a result, the supply of the current to the organic EL element 21 is cut off, and the organic EL element 21 is turned off. Furthermore, in the period P22, the scanning signal GL(n−1) changes from the low level to a high level, so that the first initialization transistor T1 goes into an on state. As a result, as indicated by an arrow denoted by reference character 72 in FIG. 15, the potential of the drive current control node NG is initialized based on the first initialization potential Vini1.

Figure 16:
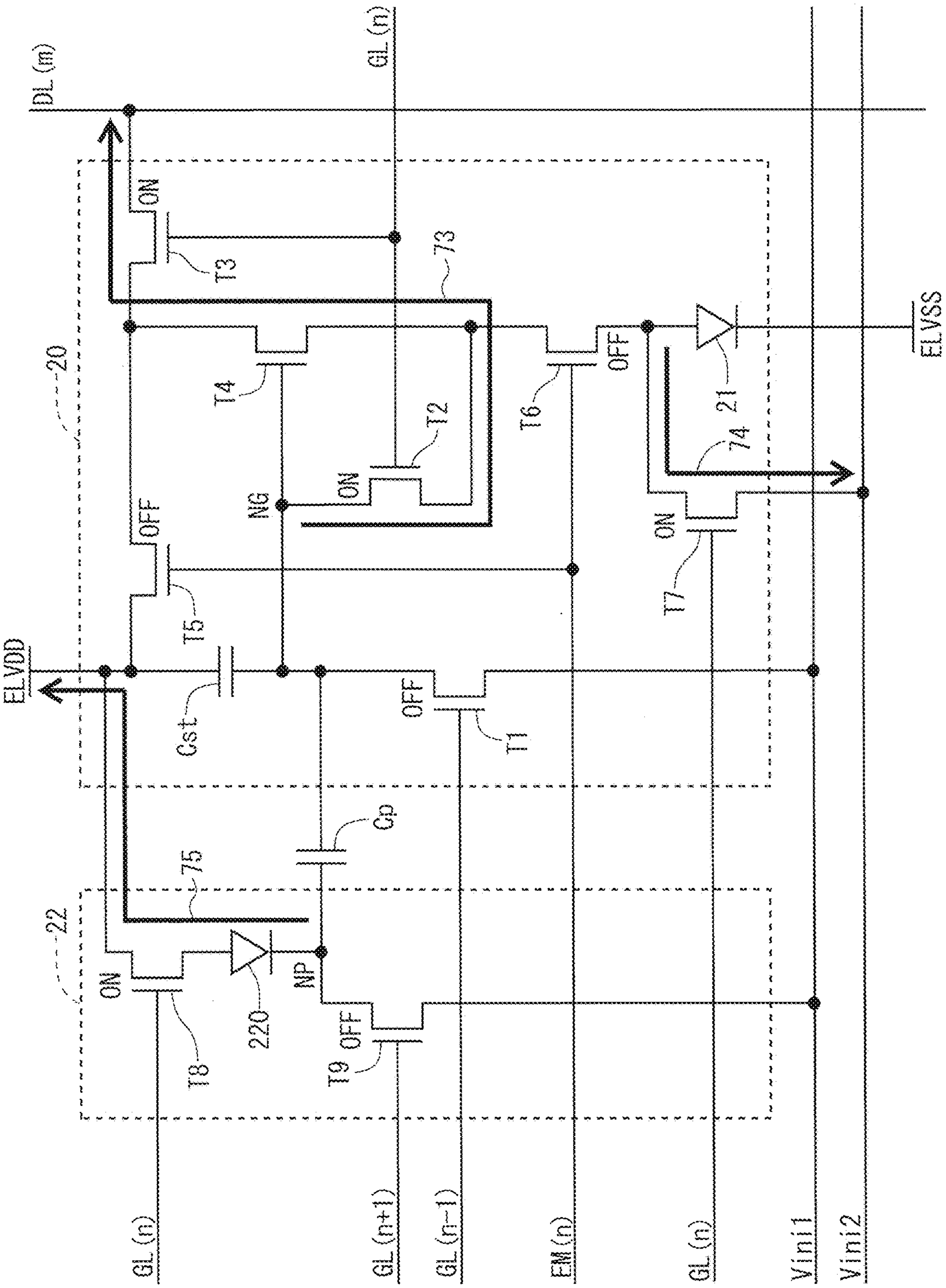
FIG. 16 is a diagram for explaining operations of the pixel circuit and its peripheral circuits in the third embodiment.

In the period P23, the scanning signal GL(n−1) changes from the high level to the low level. As a result, the first initialization transistor T1 is turned off. Furthermore, in the period P23, the scanning signal GL(n) changes from the low level to the high level. As a result, the threshold voltage compensation transistor T2, the write control transistor T3, the second initialization transistor T7, and the photocurrent control transistor T8 are turned on. When the threshold voltage compensation transistor T2 and the write control transistor T3 are turned on, the data signal DL(m) is provided to the drive current control node NG via the write control transistor T3, the drive transistor T4, and the threshold voltage compensation transistor T2, as indicated by an arrow denoted by reference character 73 in FIG. 16. Furthermore, when the second initialization transistor T7 is turned on, the anode potential of the organic EL element 21 is initialized based on the second initialization potential Vini2 as indicated by an arrow denoted by reference character 74 in FIG. 16. Furthermore, when the photocurrent control transistor T8 is turned on, as indicated by an arrow denoted by reference character 75 in FIG. 16, a current (photocurrent) depending on the intensity of light (that is, external light) incident on the photodiode 220 flows from the light emission intensity adjustment node NP to the high-level power supply line via the photodiode 220 and the photocurrent control transistor T8. In this regard, as the intensity of external light is higher, the amount of photocurrent is larger, and the potential of the light emission intensity adjustment node NP is greatly reduced.

Figure 17:
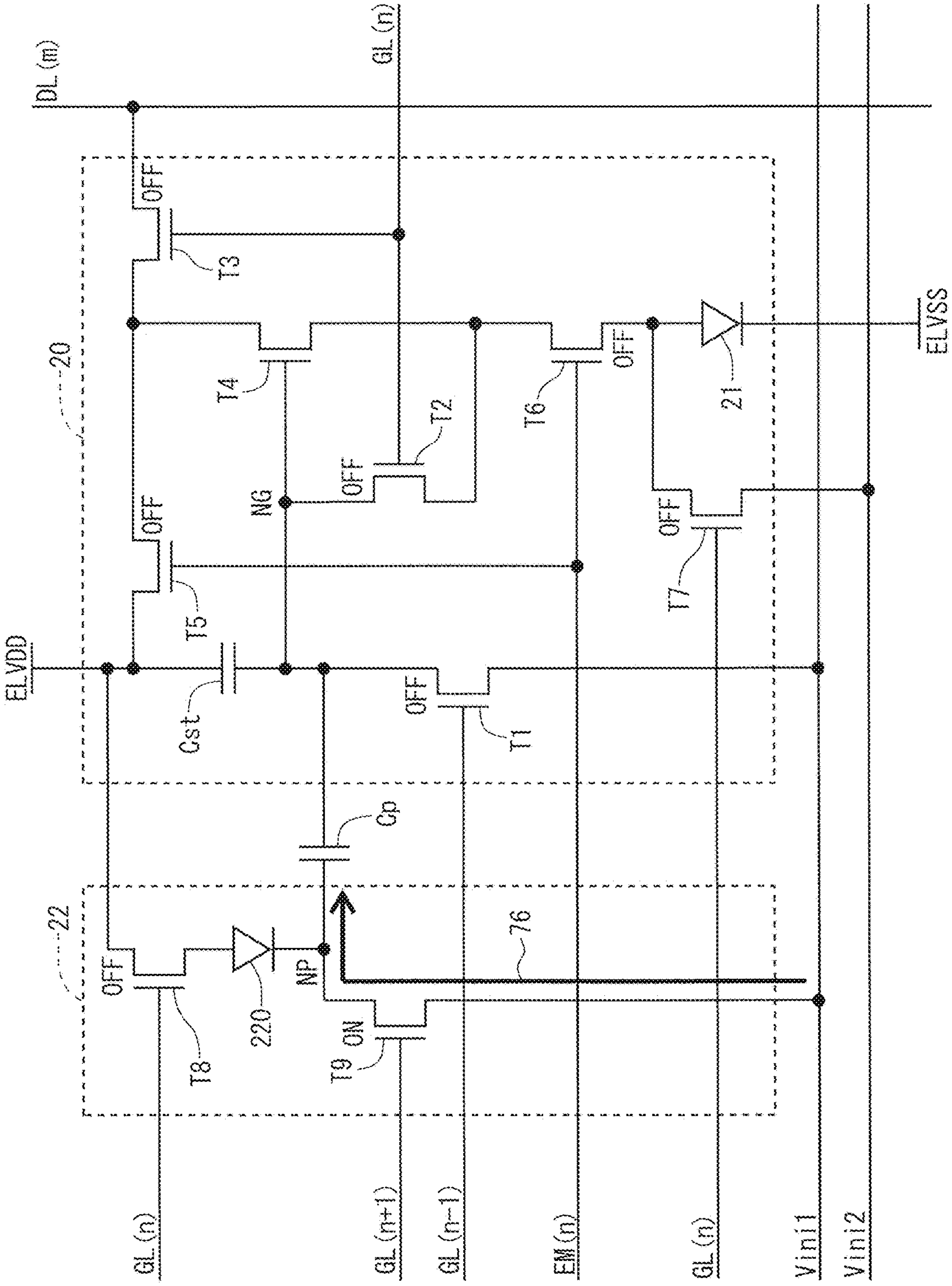
FIG. 17 is a diagram for explaining operations of the pixel circuit and its peripheral circuits in the third embodiment.

In a period P24, the scanning signal GL(n) changes from the high level to the low level. As a result, the threshold voltage compensation transistor T2, the write control transistor T3, the second initialization transistor T7, and the photocurrent control transistor T8 are turned off. Furthermore, in the period P24, the scanning signal GL(n+1) changes from the low level to the high level. As a result, the third initialization transistor T9 is turned on, and the potential of the light emission intensity adjustment node NP is initialized based on the first initialization potential Vini1 as indicated by an arrow denoted by reference character 76 in FIG. 17. Meanwhile, the first initialization potential Vini1 is set to a potential higher than the high-level power supply potential ELVDD in the present embodiment, and in the period P23, the potential of the light emission intensity adjustment node NP becomes lower than the first initialization potential Vini1 and higher than the high-level power supply potential ELVDD due to the discharge of the light emission intensity adjustment node NP. Therefore, when the potential of the light emission intensity adjustment node NP is initialized based on the first initialization potential Vini1 in the period P24, the potential of the light emission intensity adjustment node NP increases. As a result, the potential of the drive current control node NG also increases via the adjustment capacitor Cp.

In the period P25, the scanning signal GL(n+1) changes from the high level to the low level. As a result, the third initialization transistor T9 is turned off. Furthermore, in the period P25, the light emission control signal EM(n) changes from the low level to the high level. As a result, the power supply control transistor T5 and the light emission control transistor T6 are turned on, and a drive current flows as indicated by an arrow denoted by reference character 71 in FIG. 14. That is, the organic EL element 21 emits light depending on the magnitude of the drive current.

<3.4 Effects>

In the present embodiment, in the period P23, as the intensity of the external light is higher, the potential of the light emission intensity adjustment node NP greatly decreases. Then, the potential of the drive current control node NG increases in the period P24 depending on the degree of decrease in the potential of the light emission intensity adjustment node NP in the period P23. Here, the drive transistor T4 is an N-channel transistor. Therefore, as the intensity of the external light is higher, a larger amount of drive current than the original amount is supplied to the organic EL element 21. In this way, visibility under external light is improved. Furthermore, similarly to the first embodiment, no deterioration in display quality is caused and there is no need to provide a special system or chip. From the above, according to the present embodiment, with respect to the organic EL display device in which the transistors in the pixel circuit 20 include only the N-channel transistors, the visibility under the environment where the external light is strong is improved while the deterioration in display quality and the increase in cost are suppressed. Furthermore, similarly to the second embodiment, by adopting the IGZO-TFT as the N-channel transistor, low-frequency driving can be performed, and power consumption is remarkably reduced.

4. Fourth Embodiment

<4.1 Outline and the Like>

In the first to third embodiments, the adjustment circuit 22 and the adjustment capacitor Cp are provided for each pixel circuit 20. On the other hand, in the present embodiment, the adjustment capacitor Cp is provided for each pixel circuit 20, but the adjustment circuit 22 is provided for every three pixel circuits 20. The overall configuration is similar to that of the first embodiment.

<4.2 Configuration of Pixel Circuit and its Peripheral Circuits>

Figure 18:
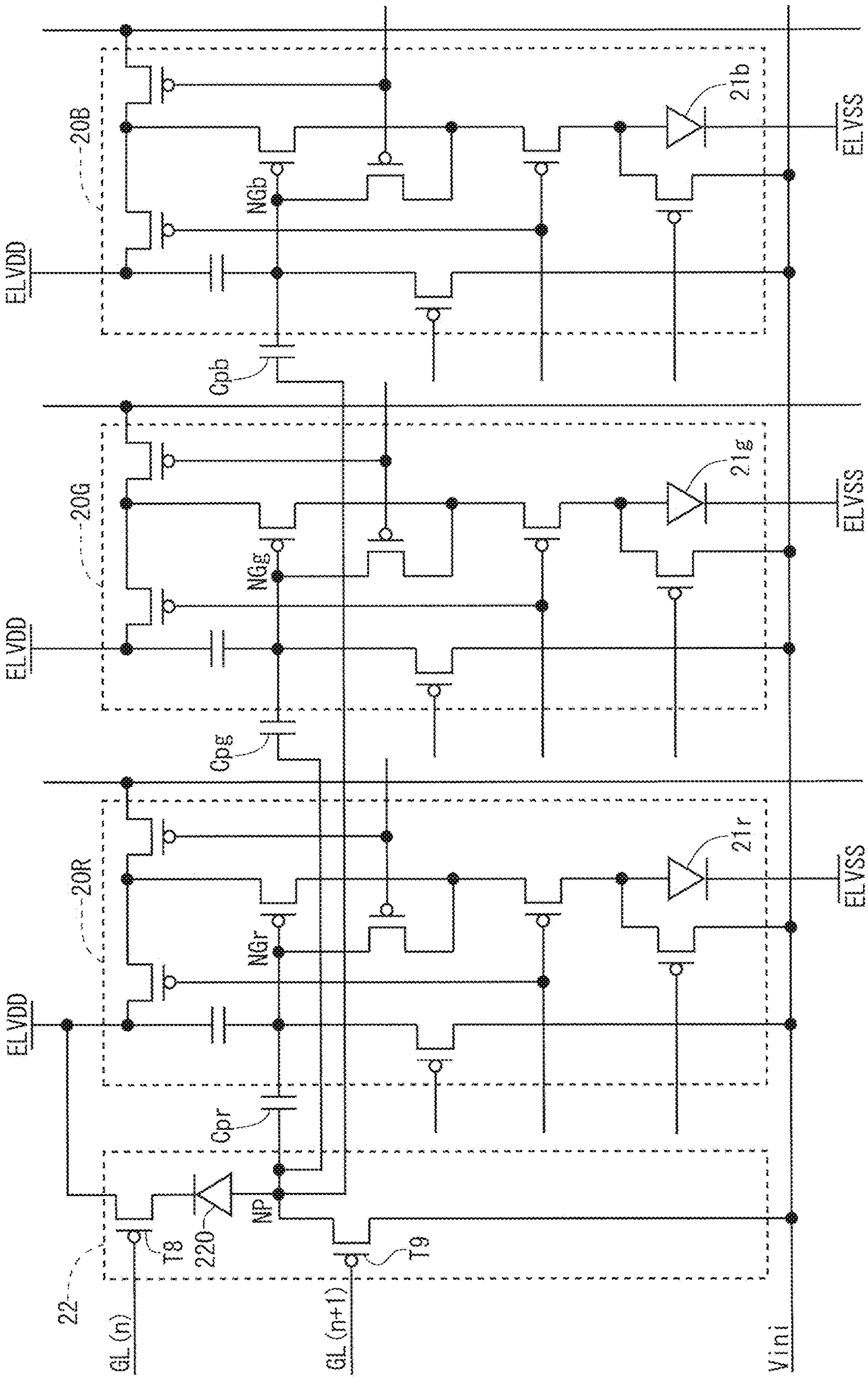
FIG. 18 is a circuit diagram illustrating a configuration of a pixel circuit and its peripheral circuits in a fourth embodiment.

FIG. 18 is a circuit diagram illustrating a configuration of a pixel circuit 20 and its peripheral circuits in the present embodiment. As can be grasped from FIG. 18, in the present embodiment, one adjustment circuit 22 is provided for three pixel circuits 20 (red pixel circuit 20R, green pixel circuit 20G, and blue pixel circuit 20B) constituting one pixel. More specifically, one photodiode 220, one photocurrent control transistor T8, and one third initialization transistor T9 are provided for every three pixel circuits 20 constituting one pixel. The adjustment capacitor Cp is provided for each pixel circuit 20. That is, for every three pixel circuits 20 constituting one pixel, an adjustment capacitor Cpr including a first electrode connected to a drive current control node NGr in the red pixel circuit 20R and a second electrode connected to the light emission intensity adjustment node NP, an adjustment capacitor Cpg including a first electrode connected to a drive current control node NGg in the green pixel circuit 20G and a second electrode connected to the light emission intensity adjustment node NP, and an adjustment capacitor Cpb including a first electrode connected to a drive current control node NGb in the blue pixel circuit 20B and a second electrode connected to the light emission intensity adjustment node NP are provided.

The adjustment circuit 22 is provided for every three pixel circuits 20 as described above, and the second electrodes of the three adjustment capacitors Cp (adjustment capacitor Cpr, adjustment capacitor Cpg, and adjustment capacitor Cpb) corresponding to the three pixel circuits 20 are connected to the same light emission intensity adjustment node NP. Furthermore, the first electrode of each of the three adjustment capacitors Cp (adjustment capacitor Cpr, adjustment capacitor Cpg, and adjustment capacitor Cpb) is connected to the drive current control node NG included in the corresponding pixel circuit 20.

Note that, in the present embodiment, all the transistors in the pixel circuit 20 are P-channel transistors, but it is not limited thereto. Similarly to the second embodiment, a P-channel transistor and an N-channel transistor may be included in the transistors in the pixel circuit 20 (see FIG. 10). In this case, N-channel transistors are adopted for the photocurrent control transistor T8 and the third initialization transistor T9. Furthermore, as in the third embodiment, all the transistors in the pixel circuit 20 may be N-channel transistors (see FIG. 12). Also in this case, the N-channel transistors are adopted for the photocurrent control transistor T8 and the third initialization transistor T9.

<4.3 Operation of Pixel Circuit and its Peripheral Circuits>

Figure 3:
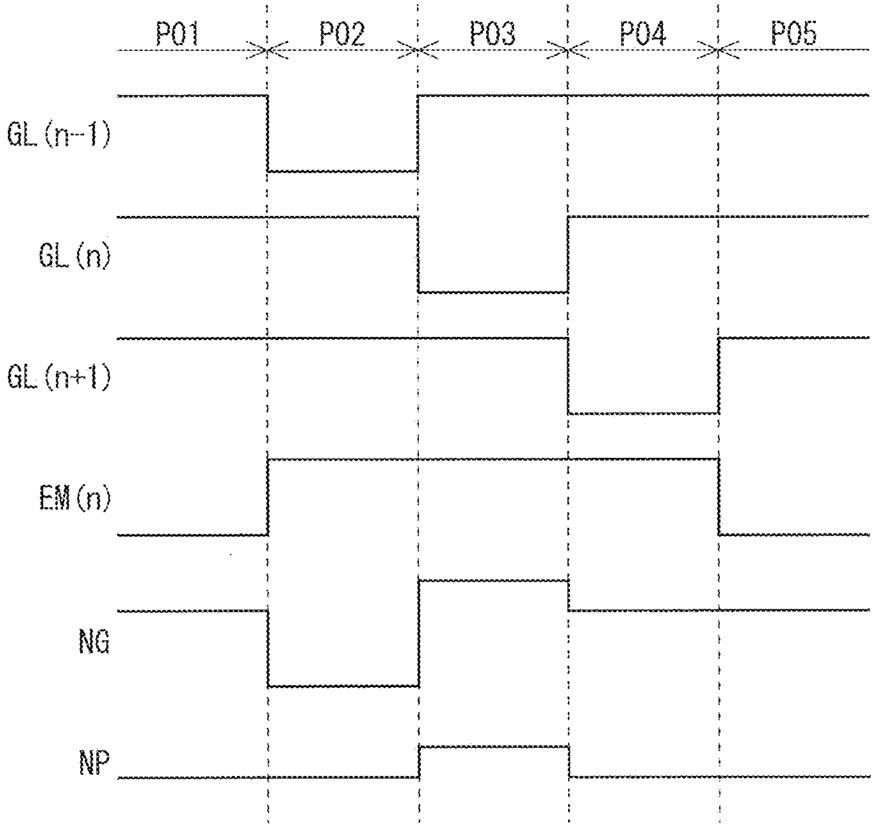
FIG. 3 is a timing chart for explaining operations of the pixel circuit and its peripheral circuits in the first embodiment.

Each pixel circuit 20 (red pixel circuit 20R, green pixel circuit 20G, and blue pixel circuit 20B) and its peripheral circuits operate in the same manner as in the first embodiment (see FIG. 3). In this regard, when the potential of the light emission intensity adjustment node NP is initialized based on the initialization potential Vini (see the period P04 in FIG. 3), the potentials of the drive current control node NGr in the red pixel circuit 20R, the drive current control node NGg in the green pixel circuit 20G, and the drive current control node NGb in the blue pixel circuit 20B decrease depending on the respective capacitance values (capacitances) of the adjustment capacitor Cpr, the adjustment capacitor Cpg, and the adjustment capacitor Cpb. At that time, as the intensity of the external light increases, the potentials of the drive current control node NGr, the drive current control node NGg, and the drive current control node NGb decrease greatly. That is, as the intensity of the external light is higher, a larger amount of drive current than the original amount is supplied to an organic EL element 21*r* in the red pixel circuit 20R, an organic EL element 21*g* in the green pixel circuit 20G, and an organic EL element 21*b* in the blue pixel circuit 20B. This improves visibility under the external light.

Note that the sizes of the photodiode 220 and the three adjustment capacitors Cp (adjustment capacitor Cpr, adjustment capacitor Cpg, and adjustment capacitor Cpb) need to be appropriately designed so that the potentials of the drive current control node NGr, the drive current control node NGg, and the drive current control node NGb are suitably controlled depending on the intensity of external light, thereby obtaining good visibility.

<4.4 Effects>

According to the present embodiment, similarly to the first embodiment, regarding the organic EL display device, the visibility in an environment where external light is strong is improved while suppressing a decrease in display quality and an increase in cost. Furthermore, since the adjustment circuit 22 including the photodiode 220, the photocurrent control transistor T8, and third the initialization transistor T9 is provided for every three pixel circuits 20, the degree of freedom in the layout of the pixel circuit 20 is higher than that in the first embodiment.

<4.5 Modification>

In the fourth embodiment, the adjustment circuit 22 is provided for every three pixel circuits 20 (red pixel circuit 20R, green pixel circuit 20G, and blue pixel circuit 20B) constituting one pixel. However, it is not limited thereto, and the adjustment circuit 22 may be provided for every plural (for example, three) pixel circuits 20 for the same color. This will be described below with reference to FIG. 19.

Figure 19:
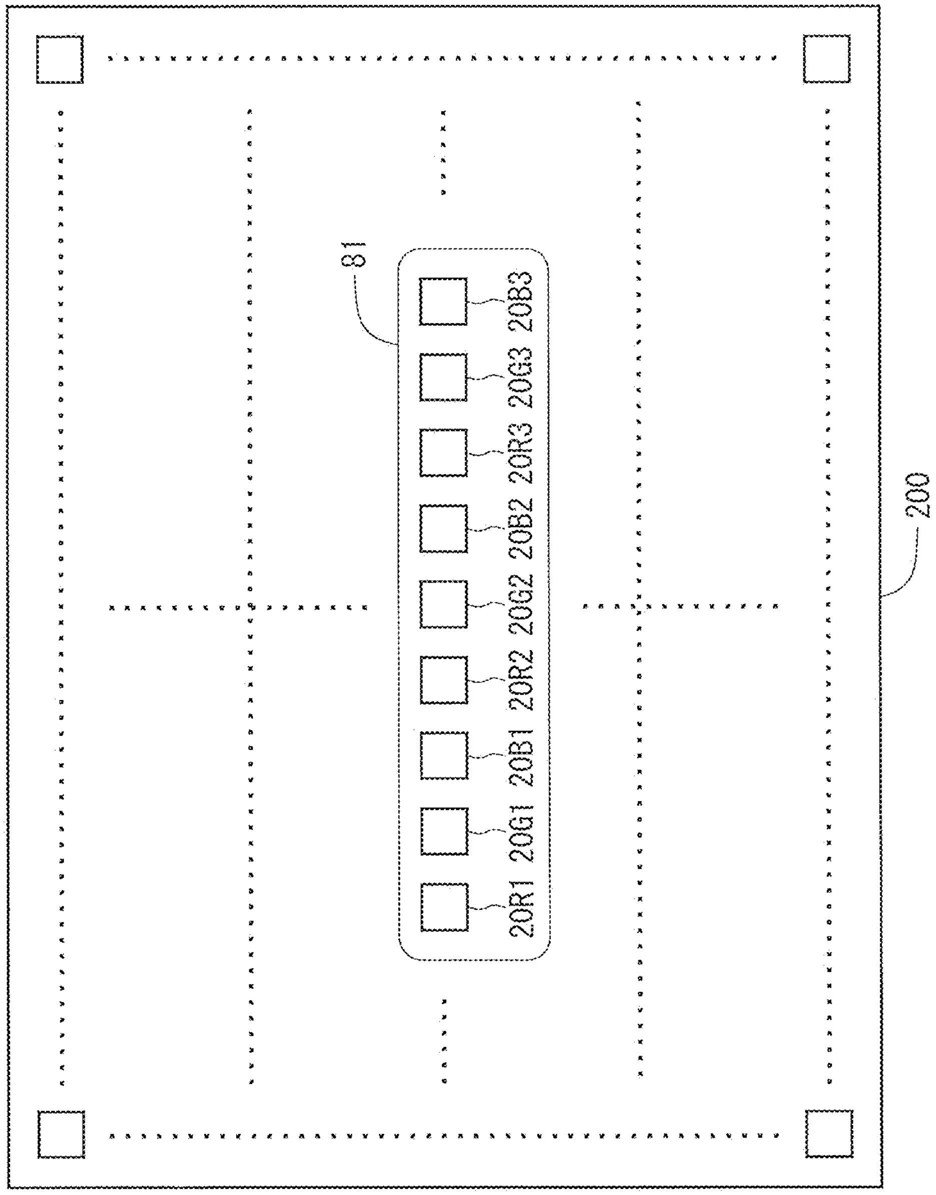
FIG. 19 is a diagram for explaining how to provide an adjustment circuit in a modification of the fourth embodiment.

In FIG. 19, a part denoted by reference character 81 indicates some pixel circuits (9 pixel circuits) in the display unit 200. A pixel circuit denoted by a reference character including R is a red pixel circuit, a pixel circuit denoted by a reference character including G is a green pixel circuit, and a pixel circuit denoted by a reference character including B is a blue pixel circuit. One pixel includes a red pixel circuit, a green pixel circuit, and a blue pixel circuit. In the present modification, one adjustment circuit 22 is provided corresponding to a pixel circuit 20R1, a pixel circuit 20R2, and a pixel circuit 20R3, one adjustment circuit 22 is provided corresponding to a pixel circuit 20G1, a pixel circuit 20G2, and a pixel circuit 20G3, and one adjustment circuit 22 is provided corresponding to a pixel circuit 20B1, a pixel circuit 20B2, and a pixel circuit 20B3. As above, the adjustment circuit 22 is provided for every three pixel circuits 20 for the same color. According to this modification, it is easy to design the size of the adjustment capacitor Cp as compared with the fourth embodiment.

Note that the configuration may be such that the adjustment circuit 22 is provided for every k pixel circuits 20 for the same color, where k is an integer of 2 or more.

<5. Others>

Although the organic EL display device has been described as an example in each of the above embodiments and modifications, the device is not limited thereto. The above disclosure can also be applied to an inorganic EL display device, a QLED display device, and the like as long as the display device includes a display element driven by a current.

DESCRIPTION OF REFERENCE CHARACTERS

20: PIXEL CIRCUIT
21: ORGANIC EL ELEMENT
22: ADJUSTMENT CIRCUIT
100: DISPLAY CONTROL CIRCUIT
200: DISPLAY UNIT
220: PHOTODIODE

300: GATE DRIVER (SCANNING SIGNAL LINE DRIVE CIRCUIT)
400: EMISSION DRIVER (LIGHT EMISSION CONTROL LINE DRIVE CIRCUIT)
500: SOURCE DRIVER (DATA SIGNAL LINE DRIVE CIRCUIT)
GL: SCANNING SIGNAL, SCANNING SIGNAL LINE
GLa: FIRST SCANNING SIGNAL, FIRST SCANNING SIGNAL LINE
GLb: SECOND SCANNING SIGNAL, SECOND SCANNING SIGNAL LINE
EM: LIGHT EMISSION CONTROL SIGNAL, LIGHT EMISSION CONTROL LINE
NG: DRIVE CURRENT CONTROL NODE
NP: LIGHT EMISSION INTENSITY ADJUSTMENT NODE
T1: FIRST INITIALIZATION TRANSISTOR
T2: THRESHOLD VOLTAGE COMPENSATION TRANSISTOR
T3: WRITE CONTROL TRANSISTOR
T4: DRIVE TRANSISTOR
T5: POWER SUPPLY CONTROL TRANSISTOR
T6: LIGHT EMISSION CONTROL TRANSISTOR
T7: SECOND INITIALIZATION TRANSISTOR
T8: PHOTOCURRENT CONTROL TRANSISTOR
T9: THIRD INITIALIZATION TRANSISTOR
Cst: HOLDING CAPACITOR
Cp: ADJUSTMENT CAPACITOR

The invention claimed is:

1. A display device including a plurality of pixel circuits, each of the pixel circuits including a display element configured to emit light with luminance depending on an amount of a drive current to be supplied, the display device comprising:
- a first power supply line to which a first power supply potential is applied;
- a second power supply line to which a second power supply potential is applied;
- an initialization power supply line to which an initialization potential is applied;
- an adjustment circuit configured to adjust an amount of the drive current; and
- an adjustment capacitor,
- wherein each of the plurality of pixel circuits includes:
- the display element provided between the first power supply line and the second power supply line, and including a first terminal on a side of the first power supply line and a second terminal on a side of the second power supply line;
- a drive transistor including a control terminal, a first conduction terminal, and a second conduction terminal, and provided in series with the display element to supply the drive current to the display element during a predetermined light emission period; and
- a drive current control node connected to the control terminal of the drive transistor and one end of the adjustment capacitor, and configured to be charged based on a data signal during a predetermined charging period,
- the adjustment circuit includes:
- a light emission intensity adjustment node connected to another end of the adjustment capacitor;
- a light receiving circuit including a light receiving element and connected to the light emission intensity adjustment node, the light receiving circuit being configured to generate a photocurrent depending on intensity of light incident on the light receiving element during the charging period; and
- a light emission intensity adjustment node initialization circuit configured to initialize the light emission intensity adjustment node based on the initialization potential during a period between the charging period and the light emission period,
- the light receiving circuit includes a photocurrent control transistor including a control terminal, a first conduction terminal, and a second conduction terminal and provided in series with the light receiving element between the first power supply line and the light emission intensity adjustment node, and
- the photocurrent control transistor is maintained in an off state during a period other than the charging period, and is turned on during the charging period.

2. The display device according to claim 1, wherein the adjustment circuit and the adjustment capacitor are provided for each of the plurality of pixel circuits.

3. The display device according to claim 1, wherein
- the drive transistor is a P-channel thin film transistor,
- the first power supply potential is higher than the second power supply potential,
- the first power supply potential is higher than the initialization potential,
- the light receiving element and the photocurrent control transistor are disposed such that the photocurrent flows from the first power supply line to the light emission intensity adjustment node during the charging period, and
- the light emission intensity adjustment node is initialized by the light emission intensity adjustment node initialization circuit, so that a potential of the light emission intensity adjustment node decreases.

4. The display device according to claim 3, further comprising:
- (i+2) scanning signal lines from a 0th scanning signal line to an (i+1)th scanning signal line where i is an integer of 2 or more; and
- a scanning signal line drive circuit configured to sequentially and selectively drive the (i+2) scanning signal lines,
- wherein the plurality of pixel circuits constitutes a pixel matrix of i rows and j columns, where j is an integer of 2 or more,
- the light emission intensity adjustment node initialization circuit includes a light emission intensity adjustment node initialization transistor including a control terminal, a first conduction terminal connected to the light emission intensity adjustment node, and a second conduction terminal connected to the initialization power supply line,
- in the adjustment circuit corresponding to a pixel circuit included in an nth row of the pixel matrix, where n is an integer of 1 or more and i or less,
  - the control terminal of the photocurrent control transistor is connected to an nth scanning signal line, and
  - the control terminal of the light emission intensity adjustment node initialization transistor is connected to an (n+1)th scanning signal line.

5. The display device according to claim 4, further comprising:
- i light emission control lines from a first light emission control line to an ith light emission control line;
- a light emission control line drive circuit configured to drive the i light emission control lines;

j data signal lines from a first data signal line to a jth data signal line; and a data signal line drive circuit configured to apply the data signal to the j data signal lines, wherein a pixel circuit included in an nth row and an mth column of the pixel matrix, where m is an integer of 1 or more and j or less, includes:

a holding capacitor including one end connected to the drive current control node and another end connected to the first power supply line;

a write control transistor including a control terminal connected to the nth scanning signal line, a first conduction terminal connected to an mth data signal line, and a second conduction terminal connected to the first conduction terminal of the drive transistor;

a threshold voltage compensation transistor including a control terminal connected to the nth scanning signal line, a first conduction terminal connected to the second conduction terminal of the drive transistor, and a second conduction terminal connected to the drive current control node;

a drive current control node initialization transistor including a control terminal connected to an (n−1)th scanning signal line, a first conduction terminal connected to the drive current control node, and a second conduction terminal connected to the initialization power supply line;

a display initialization transistor including a control terminal connected to the nth scanning signal line, a first conduction terminal connected to the first terminal of the display element, and a second conduction terminal connected to the initialization power supply line;

a power supply control transistor including a control terminal connected to an nth light emission control line, a first conduction terminal connected to the first power supply line, and a second conduction terminal connected to the first conduction terminal of the drive transistor; and a light emission control transistor including a control terminal connected to the nth light emission control line, a first conduction terminal connected to the second conduction terminal of the drive transistor, and a second conduction terminal connected to the first terminal of the display element, the photocurrent control transistor, the light emission intensity adjustment node initialization transistor, the write control transistor, the threshold voltage compensation transistor, the drive current control node initialization transistor, the display initialization transistor, the power supply control transistor, and the light emission control transistor are P-channel thin film transistors, and during a period in which the light emission control line drive circuit maintains the nth light emission control line in a non-selected state, the scanning signal line drive circuit sequentially brings the (n−1)th scanning signal line, the nth scanning signal line, and the (n+1)th scanning signal line into a selected state for each predetermined period.

6. The display device according to claim 5, wherein a capacitance value of the holding capacitor is larger than a capacitance value of the adjustment capacitor.

7. The display device according to claim 3, wherein the light emission intensity adjustment node initialization circuit includes a light emission intensity adjustment node initialization transistor including a control terminal, a first conduction terminal connected to the light emission intensity adjustment node, and a second conduction terminal connected to the initialization power supply line, and the photocurrent control transistor and the light emission intensity adjustment node initialization transistor are N-channel thin film transistors in which a channel layer is formed of an oxide semiconductor.

8. The display device according to claim 7, further comprising:

(i+2) first scanning signal lines from a 0th first scanning signal line to an (i+1)th first scanning signal line where i is an integer of 2 or more;

i second scanning signal lines from a first second scanning signal line to an ith second scanning signal line;

a scanning signal line drive circuit configured to sequentially and selectively drive the (i+2) first scanning signal lines and sequentially and selectively drive the i second scanning signal lines;

i light emission control lines from a first light emission control line to an ith light emission control line;

a light emission control line drive circuit configured to drive the i light emission control lines;

j data signal lines from a first data signal line to a jth data signal line where j is an integer of 2 or more; and a data signal line drive circuit configured to apply the data signal to the j data signal lines, wherein the plurality of pixel circuits constitutes a pixel matrix of i rows and j columns, a pixel circuit included in an nth row and an mth column of the pixel matrix, where n is an integer of 1 or more and i or less and m is an integer of 1 or more and j or less, includes:

a holding capacitor including one end connected to the drive current control node and another end connected to the first power supply line;

a write control transistor including a control terminal connected to an nth second scanning signal line, a first conduction terminal connected to an mth data signal line, and a second conduction terminal connected to the first conduction terminal of the drive transistor;

a threshold voltage compensation transistor including a control terminal connected to an nth first scanning signal line, a first conduction terminal connected to the second conduction terminal of the drive transistor, and a second conduction terminal connected to the drive current control node;

a drive current control node initialization transistor including a control terminal connected to an (n−1)th first scanning signal line, a first conduction terminal connected to the drive current control node, and a second conduction terminal connected to the initialization power supply line;

a display initialization transistor including a control terminal connected to the nth first scanning signal line, a first conduction terminal connected to the first terminal of the display element, and a second conduction terminal connected to the initialization power supply line;

a power supply control transistor including a control terminal connected to an nth light emission control line, a first conduction terminal connected to the first power supply line, and a second conduction terminal connected to the first conduction terminal of the drive transistor; and a light emission control transistor including a control terminal connected to the nth light emission control line, a first conduction terminal connected to the second conduction terminal of the drive transistor, and a second conduction terminal connected to the first terminal of the display element, in the adjustment circuit corresponding to a pixel circuit included in an nth row of the pixel matrix, the control terminal of the photocurrent control transistor is connected to the nth first scanning signal line, and the control terminal of the light emission intensity adjustment node initialization transistor is connected to an (n+1)th first scanning signal line, the write control transistor, the power supply control transistor, and the light emission control transistor are P-channel thin film transistors, the threshold voltage compensation transistor, the drive current control node initialization transistor, and the display initialization transistor are N-channel thin film transistors in which a channel layer is formed of an oxide semiconductor, during a period in which the light emission control line drive circuit maintains the nth light emission control line in a non-selected state, the scanning signal line drive circuit sequentially brings the (n−1)th first scanning signal line, the nth first scanning signal line, and the (n+1)th first scanning signal line into a selected state for each predetermined period, and the scanning signal line drive circuit brings the nth second scanning signal line into a selected state during a period in which the nth first scanning signal line is in a selected state.

9. The display device according to claim 3, wherein the light receiving element is a photodiode including an anode terminal and a cathode terminal, the first conduction terminal of the photocurrent control transistor is connected to the first power supply line, the second conduction terminal of the photocurrent control transistor is connected to the cathode terminal of the photodiode, and the anode terminal of the photodiode is connected to the light emission intensity adjustment node.

10. The display device according to claim 3, wherein the light receiving element is a photodiode including an anode terminal and a cathode terminal, the cathode terminal of the photodiode is connected to the first power supply line, the anode terminal of the photodiode is connected to the first conduction terminal of the photocurrent control transistor, and the second conduction terminal of the photocurrent control transistor is connected to the light emission intensity adjustment node.

11. The display device according to claim 1, wherein the drive transistor is an N-channel thin film transistor, the initialization power supply line includes a first initialization power supply line to which a first initialization potential is applied and a second initialization power supply line to which a second initialization potential is applied, the first power supply potential is higher than the second power supply potential, the first power supply potential is lower than the first initialization potential, the first power supply potential is higher than the second initialization potential, the light receiving element and the photocurrent control transistor are disposed such that the photocurrent flows from the light emission intensity adjustment node to the first power supply line during the charging period, and the light emission intensity adjustment node is initialized based on the first initialization potential by the light emission intensity adjustment node initialization circuit, so that a potential of the light emission intensity adjustment node increases.

12. The display device according to claim 11, further comprising:

(i+2) scanning signal lines from a 0th scanning signal line to an (i+1)th scanning signal line where i is an integer of 2 or more; and a scanning signal line drive circuit configured to sequentially and selectively drive the (i+2) scanning signal lines, wherein the plurality of pixel circuits constitutes a pixel matrix of i rows and j columns, where j is an integer of 2 or more, the light emission intensity adjustment node initialization circuit includes a light emission intensity adjustment node initialization transistor including a control terminal, a first conduction terminal connected to the light emission intensity adjustment node, and a second conduction terminal connected to the first initialization power supply line, in the adjustment circuit corresponding to a pixel circuit included in an nth row of the pixel matrix, where n is an integer of 1 or more and i or less, the control terminal of the photocurrent control transistor is connected to an nth scanning signal line, and the control terminal of the light emission intensity adjustment node initialization transistor is connected to an (n+1)th scanning signal line.

13. The display device according to claim 12, further comprising:

i light emission control lines from a first light emission control line to an ith light emission control line;

a light emission control line drive circuit configured to drive the i light emission control lines;

j data signal lines from a first data signal line to a jth data signal line; and a data signal line drive circuit configured to apply the data signal to the j data signal lines, wherein a pixel circuit included in an nth row and an mth column of the pixel matrix, where m is an integer of 1 or more and j or less, includes:

a holding capacitor including one end connected to the drive current control node and another end connected to the first power supply line;

a write control transistor including a control terminal connected to the nth scanning signal line, a first conduction terminal connected to an mth data signal line, and a second conduction terminal connected to the first conduction terminal of the drive transistor;

a threshold voltage compensation transistor including a control terminal connected to the nth scanning signal line, a first conduction terminal connected to the second conduction terminal of the drive transistor, and a second conduction terminal connected to the drive current control node;

a drive current control node initialization transistor including a control terminal connected to an (n−1)th scanning signal line, a first conduction terminal connected to the drive current control node, and a second conduction terminal connected to the first initialization power supply line;

a display initialization transistor including a control terminal connected to the nth scanning signal line, a first conduction terminal connected to the first terminal of the display element, and a second conduction terminal connected to the second initialization power supply line;

a power supply control transistor including a control terminal connected to an nth light emission control line, a first conduction terminal connected to the first power supply line, and a second conduction terminal connected to the first conduction terminal of the drive transistor; and a light emission control transistor including a control terminal connected to the nth light emission control line, a first conduction terminal connected to the second conduction terminal of the drive transistor, and a second conduction terminal connected to the first terminal of the display element, the photocurrent control transistor, the light emission intensity adjustment node initialization transistor, the write control transistor, the threshold voltage compensation transistor, the drive current control node initialization transistor, the display initialization transistor, the power supply control transistor, and the light emission control transistor are N-channel thin film transistors, and during a period in which the light emission control line drive circuit maintains the nth light emission control line in a non-selected state, the scanning signal line drive circuit sequentially brings the (n−1)th scanning signal line, the nth scanning signal line, and the (n+1)th scanning signal line into a selected state for each predetermined period.

14. The display device according to claim 11, wherein the light receiving element is a photodiode including an anode terminal and a cathode terminal, the first conduction terminal of the photocurrent control transistor is connected to the first power supply line, the second conduction terminal of the photocurrent control transistor is connected to the anode terminal of the photodiode, and the cathode terminal of the photodiode is connected to the light emission intensity adjustment node.

15. The display device according to claim 11, wherein the light receiving element is a photodiode including an anode terminal and a cathode terminal, the anode terminal of the photodiode is connected to the first power supply line, the cathode terminal of the photodiode is connected to the first conduction terminal of the photocurrent control transistor, and the second conduction terminal of the photocurrent control transistor is connected to the light emission intensity adjustment node.

16. A display device including a plurality of pixel circuits, each of the pixel circuits including a display element configured to emit light with luminance depending on an amount of a drive current to be supplied, the display device comprising:

a first power supply line to which a first power supply potential is applied;

a second power supply line to which a second power supply potential is applied;

an initialization power supply line to which an initialization potential is applied;

an adjustment circuit configured to adjust an amount of the drive current; and an adjustment capacitor, wherein each of the plurality of pixel circuits includes:

the display element provided between the first power supply line and the second power supply line, and including a first terminal on a side of the first power supply line and a second terminal on a side of the second power supply line;

a drive transistor including a control terminal, a first conduction terminal, and a second conduction terminal, and provided in series with the display element to supply the drive current to the display element during a predetermined light emission period; and a drive current control node connected to the control terminal of the drive transistor and one end of the adjustment capacitor, and configured to be charged based on a data signal during a predetermined charging period, the adjustment circuit includes:

a light emission intensity adjustment node connected to another end of the adjustment capacitor;

a light receiving circuit including a light receiving element and connected to the light emission intensity adjustment node, the light receiving circuit being configured to generate a photocurrent depending on intensity of light incident on the light receiving element during the charging period; and a light emission intensity adjustment node initialization circuit configured to initialize the light emission intensity adjustment node based on the initialization potential during a period between the charging period and the light emission period, the adjustment capacitor is provided for each of the plurality of pixel circuits, the adjustment circuit is provided for every k pixel circuits, where k is an integer of 2 or more, other ends of k adjustment capacitors corresponding to the k pixel circuits are connected to a same light emission intensity adjustment node, and one end of each of the k adjustment capacitors is connected to the drive current control node included in a corresponding pixel circuit.

17. The display device according to claim 16, wherein the k pixel circuits include a red pixel circuit, a green pixel circuit, and a blue pixel circuit.

18. The display device according to claim 16, wherein the plurality of pixel circuits includes a red pixel circuit, a green pixel circuit, and a blue pixel circuit, and the adjustment circuit is provided for every k pixel circuits for a same color.

19. A driving method for a display device including a plurality of pixel circuits, each of the plurality of pixel circuits including a display element configured to emit light with luminance depending on an amount of a drive current to be supplied, the display device including:

a first power supply line to which a first power supply potential is applied;

a second power supply line to which a second power supply potential is applied;

an initialization power supply line to which an initialization potential is applied;

an adjustment circuit configured to adjust an amount of the drive current; and an adjustment capacitor, each of the plurality of pixel circuits including:

the display element provided between the first power supply line and the second power supply line, and including a first terminal on a side of the first power supply line and a second terminal on a side of the second power supply line;

a drive transistor including a control terminal, a first conduction terminal, and a second conduction terminal, and provided in series with the display element to supply a drive current to the display element during a predetermined light emission period; and a drive current control node connected to the control terminal of the drive transistor and one end of the adjustment capacitor, the adjustment circuit including:

a light emission intensity adjustment node connected to another end of the adjustment capacitor; and a light receiving circuit connected to the light emission intensity adjustment node, the light receiving circuit including a light receiving element and a photocurrent control transistor including a control terminal, a first conduction terminal, and a second conduction terminal and provided in series with the light receiving element between the first power supply line and the light emission intensity adjustment node, the driving method comprising the steps of:

(a) stopping supply of the drive current to the display element;

(b) charging the drive current control node based on a data signal, and generating a photocurrent depending on intensity of light incident on the light receiving element by the light receiving circuit;

(c) initializing the light emission intensity adjustment node based on the initialization potential; and (d) resuming the supply of the drive current to the display element, immediately after the start of step (b), the photocurrent control transistor changes from an off state to an on state, and immediately after the start of step (c), the photocurrent control transistor changes from the on state to the off state.

* * * * *